US012689727B2

(12) United States Patent
Xiu et al.

(10) Patent No.: US 12,689,727 B2
(45) Date of Patent: *Jul. 21, 2026

(54) METHODS AND APPARATUS OF VIDEO CODING IN 4:4:4 COLOR FORMAT

(71) Applicant: BEIJING DAJIA INTERNET INFORMATION TECHNOLOGY CO., LTD., Beijing (CN)

(72) Inventors: Xiaoyu Xiu, Beijing (CN); Yi-Wen Chen, Beijing (CN); Tsung-Chuan Ma, Beijing (CN); Hong-Jheng Jhu, Beijing (CN); Wei Chen, Beijing (CN); Che-Wei Kuo, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,274

(22) Filed: Jul. 10, 2024

(65) Prior Publication Data

US 2024/0364886 A1 Oct. 31, 2024

Related U.S. Application Data

(63) Continuation of application No. 18/064,831, filed on Dec. 12, 2022, now Pat. No. 12,075,047, which is a
(Continued)

(51) Int. Cl.
*H04N 19/12* (2014.01)
*H04N 19/124* (2014.01)
(Continued)

(52) U.S. Cl.
CPC ........... *H04N 19/12* (2014.11); *H04N 19/124* (2014.11); *H04N 19/132* (2014.11); *H04N 19/18* (2014.11);
(Continued)

(58) Field of Classification Search
CPC .... H04N 19/12; H04N 19/124; H04N 19/132; H04N 19/18; H04N 19/186; H04N 19/30;
(Continued)

(56) References Cited

U.S. PATENT DOCUMENTS

| | | | |
|---|---|---|---|
| 10,469,847 B2 | 11/2019 | Xiu et al. | |
| 2012/0114034 A1 | 5/2012 | Huang et al. | |

(Continued)

FOREIGN PATENT DOCUMENTS

| | | |
|---|---|---|
| CN | 104247424 A | 12/2014 |
| CN | 104685872 A | 6/2015 |

(Continued)

OTHER PUBLICATIONS

Bross et al., "Versatile Video Coding (Draft 9)," Document: JVET-R2001-vA, Joint Video 1 Experts Team (JVET) of ITU-T SG 16 WP 3 and ISO/IEC JTC 1/SC 29/WG 11, 18th Meeting: by teleconference, Apr. 15-24, 2020, 20 pages.
(Continued)

*Primary Examiner* — Nam D Pham
(74) *Attorney, Agent, or Firm* — Seed IP Law Group LLP

(57) ABSTRACT

An electronic apparatus performs a method of coding video data. The method comprises: receiving, from the bitstream, syntax elements associated with a coding unit, wherein the syntax elements include a first coded block flag (CBF) for residual samples of a first chroma component, a second CBF for residual samples of a second chroma component, and a third syntax element indicating whether adaptive color transform (ACT) is applied to the coding unit; determining
(Continued)

900 receiving, from bitstream, a plurality of syntax elements associated with a coding unit, wherein the syntax elements include a first coded block flag (CBF) for residual samples of a first chroma component of the coding unit, a second CBF for residual samples of a second chroma component of the coding unit, and a third syntax element indicating whether adaptive color transform (ACT) is applied to the coding unit or not 910 determining whether to perform the chroma residual scaling to the residual samples of the first and second chroma components according to the first CBF, the second CBF, and the third syntax element 920 in accordance with a determination to perform the chroma residual scaling to the residual samples of at least one of the first and second chroma components, scaling the residual samples of the at least one of the first and second chroma components based on a corresponding scaling parameter 930 reconstructing samples of the coding unit using luma and chroma residual samples after scaling 940 whether to perform the chroma residual scaling to the residual samples of the chroma components according to the first CBF, the second CBF, and the third syntax element; in accordance with a determination to perform the chroma residual scaling to the residual samples of the first and second chroma components, scaling the residual samples of the at least one of the first and second chroma components based on a corresponding scaling parameter.

20 Claims, 14 Drawing Sheets

Related U.S. Application Data continuation of application No. PCT/US2021/037197, filed on Jun. 14, 2021.

(60) Provisional application No. 63/038,692, filed on Jun. 12, 2020.

(51) Int. Cl.
| | |
|---|---|
| *H04N 19/132* | (2014.01) |
| *H04N 19/18* | (2014.01) |
| *H04N 19/186* | (2014.01) |
| *H04N 19/30* | (2014.01) |
| *H04N 19/60* | (2014.01) |
| *H04N 19/70* | (2014.01) |

(52) U.S. Cl.
CPC ........... *H04N 19/186* (2014.11); *H04N 19/30* (2014.11); *H04N 19/60* (2014.11); *H04N 19/70* (2014.11)

(58) Field of Classification Search
CPC ...... H04N 19/60; H04N 19/70; H04N 19/157; H04N 19/176
See application file for complete search history.

(56) References Cited

U.S. PATENT DOCUMENTS

| | | |
|---|---|---|
| 2013/0266074 A1 | 10/2013 | Guo et al. |
| 2015/0016512 A1 | 1/2015 | Pu et al. |
| 2015/0124865 A1 | 5/2015 | Kim et al. |
| 2015/0373349 A1* | 12/2015 | Zhang .................... H04N 19/13 |
| | | 375/240.02 |
| 2016/0080751 A1 | 3/2016 | Xiu et al. |
| 2017/0318301 A1 | 11/2017 | Li et al. |
| 2019/0045209 A1 | 2/2019 | Ramasubramonian et al. |
| 2020/0053252 A1 | 2/2020 | Mahmalat et al. |

FOREIGN PATENT DOCUMENTS

| | | |
|---|---|---|
| CN | 105308960 A | 2/2016 |
| CN | 105960802 A | 9/2016 |
| CN | 106664425 A | 5/2017 |
| CN | 107079157 A | 8/2017 |
| CN | 106797465 B | 7/2019 |
| CN | 107211151 B | 3/2020 |
| GB | 2531004 A | 4/2016 |
| JP | 2024120053 A | 9/2024 |
| JP | 2024120056 A | 9/2024 |
| KR | 20160024886 A | 3/2016 |
| KR | 20160029144 A | 3/2016 |
| KR | 20170057312 A | 5/2017 |
| KR | 20170108964 A | 9/2017 |
| KR | 101997686 B1 | 7/2019 |
| KR | 102051193 B1 | 12/2019 |
| KR | 20200053603 A | 5/2020 |
| WO | 2021061794 A1 | 4/2021 |
| WO | 2021072379 A1 | 4/2021 |

OTHER PUBLICATIONS

Bross, Benjamin et al., "Versatile Video Coding (Draft 8)," Joint Video Experts Team (JVET) of ITU-T SG 16 WP 3 and ISO/IEC JTC 1/SC 29/WG 11, 17th Meeting, Brussels, BE, Jan. 7-17, 2020, 209 paages.

Chen et al., "Algorithm description for Versatile Video Coding and Test Model 8 (VTM 8)," Document: JVET-Q2002-v3, Joint Video Experts Team (JVET) of ITU-T SG 16 WP 3 and ISO/IEC JTC 1/SC 29/WG 11, 17th Meeting: Brussels, BE, Jan. 7-17, 2020, 7 pages.

Xiu et al., "Mismatch between text specification and reference software on chroma residual scaling when ACT is enabled," Document JVET-S0234, Joint Video Experts Team (JVET) of ITU-T SG 16 WP 3 and ISO/IEC JTC 1/SC 29/WG 11, 19th Meeting: by teleconference, Jun. 22-Jul. 1, 2020, 7 pages.

Xiu et al., "Mismatch between text specification and reference software on chroma residual scaling when ACT is enabled," Preview document JVET-S0234 for Teleconference meeting (MPEG No. m54242), 5 pages.

* cited by examiner

900 receiving, from bitstream, a plurality of syntax elements associated with a coding unit, wherein the syntax elements include a first coded block flag (CBF) for residual samples of a first chroma component of the coding unit, a second CBF for residual samples of a second chroma component of the coding unit, and a third syntax element indicating whether adaptive color transform (ACT) is applied to the coding unit or not 910 determining whether to perform the chroma residual scaling to the residual samples of the first and second chroma components according to the first CBF, the second CBF, and the third syntax element 920 in accordance with a determination to perform the chroma residual scaling to the residual samples of at least one of the first and second chroma components, scaling the residual samples of the at least one of the first and second chroma components based on a corresponding scaling parameter 930 reconstructing samples of the coding unit using luma and chroma residual samples after scaling 940

FIG. 9

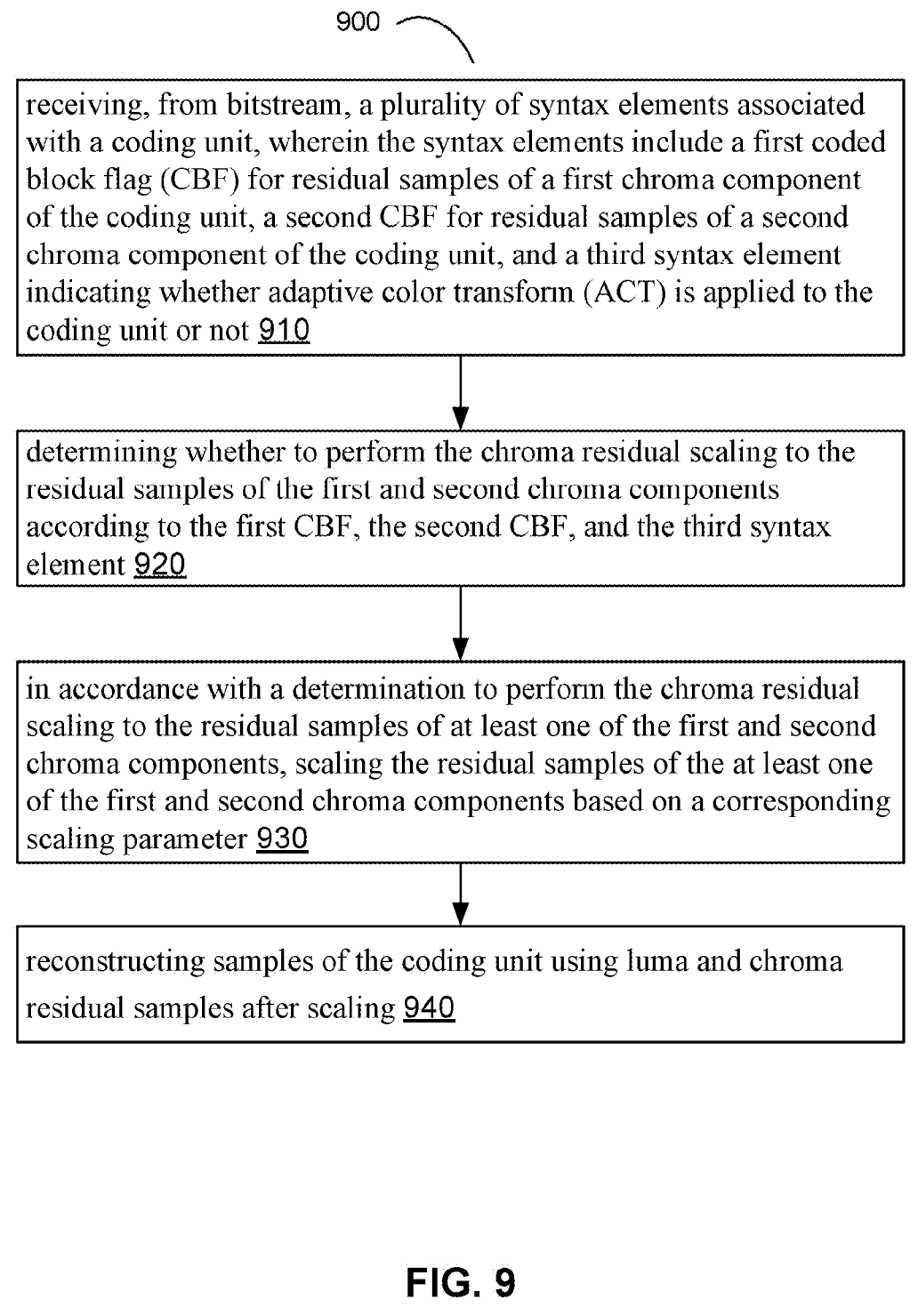

METHODS AND APPARATUS OF VIDEO CODING IN 4:4:4 COLOR FORMAT

CROSS-REFERENCE TO RELATED APPLICATIONS

The present application is a continuation application of U.S. Ser. No. 18/064,831, which is a continuation application of International Application No. PCT/US2021/037197, filed on Jun. 14, 2021, which is based upon and claims priority to U.S. Provisional Patent Application No. 63/038,692, entitled "METHODS AND APPARATUS ON 4:4:4 VIDEO CODING" filed on Jun. 12, 2020, which are incorporated by reference in their entireties.

TECHNICAL FIELD

The present application generally relates to video data coding and compression, and in particular, to method and system of conditionally applying the chroma residual scaling process according to the adaptive color transform (ACT) process.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or Intra block copy (IBC) modes. Video blocks in an intra coded (I) slice of a video frame are encoded using spatial prediction with respect to reference samples in neighboring blocks within the same video frame. Video blocks in an inter coded (P (the forward Predicted pictures) or B (bidirectionally predicted pictures)) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

Certain video content, e.g., screen content videos, is encoded in 4:4:4 chroma format in which all three components (the luma component and both chroma components) have the same resolution. Although 4:4:4 chroma format includes more redundancies compared to that in 4:2:0 chroma format and 4:2:2 chroma format (which is unfriendly to achieving a good compression efficiency), 4:4:4 chroma format is still the preferred encoding format for many applications where high fidelity is required to preserve color information, such as sharp edges, in the decoded video. Given the redundancies that exist in 4:4:4 chroma format video, there are evidences that significant coding improvement can be achieved by exploiting the correlations among the three color components of 4:4:4 video (e.g. Y, Cb and Cr in YCbCr domain; or G, B and R in RGB domain). Due to these correlations, during the development of HEVC screen content coding (SCC) extension, the adaptive color-space transform (ACT) tool is employed to exploit the correlation among three color components.

SUMMARY

The present application describes implementations related to video data encoding and decoding and, more particularly, to method and system of conditionally applying the chroma residual scaling process according to the adaptive color transform (ACT) process.

For video signal which is originally captured in 4:4:4 color format, the video may be encoded in original space so that high fidelity is achieved for the decoded video signal and there is abundant information redundancy in the original color space, e.g., RGB videos. Although some inter-component coding tools in the current VVC standard, e.g., cross-component linear model prediction (CCLM), could improve the efficiency of 4:4:4 video coding, the redundancy between the three components are not fully removed. This is because only Y/G component is utilized to predict Cb/B and Cr/R components while the correlation between Cb/B and Cr/R components is not considered. Correspondingly, further de-correlation of three color components may improve coding performance for 4:4:4 video coding.

In the current VVC standard, the designs of the existing inter and intra tools are mainly focused on videos that are captured in 4:2:0 chroma format. Therefore, in order to achieve a better complexity/performance trade-off, most of those coding tools are only applicable to the luma component but disabled for the chroma components (e.g., position-dependent intra prediction combination (PDPC), multi-reference line (MRL), and sub-partition prediction (ISP)), or use different operations to luma and chroma components (e.g., the interpolation filters that are applied to motion compensated prediction). However, compared to 4:2:0 videos, video signal in 4:4:4 chroma format represents very different characteristics. For example, Cb/B and Cr/R components of 4:4:4 YCbCr and RGB videos represent more abundant color information and possess more high-frequency information (e.g., edges and textures) than the chroma components in 4:2:0 videos. With such consideration, it may be always optimal to use the same design of some existing coding tools in the VVC for both 4:2:0 and 4:4:4 videos.

According to a first aspect of the present application, a method of decoding a video block coded with chroma residual scaling includes: receiving, from the bitstream, a plurality of syntax elements associated with a coding unit, wherein the syntax elements include a first coded block flag (CBF) for residual samples of a first chroma component of the coding unit, a second CBF for residual samples of a second chroma component of the coding unit, and a third syntax element indicating whether adaptive color transform (ACT) is applied to the coding unit or not; determining whether to perform the chroma residual scaling to the residual samples of the first and second chroma components according to the first CBF, the second CBF, and the third syntax element; in accordance with a determination to perform the chroma residual scaling to the residual samples of at least one of the first and second chroma components, scaling the residual samples of the at least one of the first and second chroma components based on a corresponding scaling parameter; and reconstructing samples of the coding unit using the luma and chroma residual samples after scaling.

In some embodiments, determining whether to perform the chroma residual scaling to the residual samples of the first and second chroma components according to the first CBF, the second CBF, and the third syntax element includes: in accordance with a determination from the third syntax element that the ACT is applied to the coding unit: applying an inverse ACT to the luma and chroma residual samples of the coding unit; and determining to perform the chroma residual scaling to the residual samples of the first and second chroma components regardless of the first CBF and the second CBF after the inverse ACT.

According to a second aspect of the present application, a method of decoding a video block coded with chroma residual scaling includes: receiving, from the bitstream, a plurality of syntax elements associated with the coding unit, wherein the syntax elements include a first coded block flag (CBF) for residual samples of a first chroma component of the coding unit, a second CBF for residual samples of a second chroma component of the coding unit, and a third syntax element indicating whether adaptive color transform

4

(ACT) is applied to the coding unit or not; determining whether to perform the chroma residual scaling to the residual samples of the first and second chroma components according to the first CBF, and the second CBF; in accordance with a determination to perform the chroma residual scaling to the residual samples of at least one of the first and second chroma components, scaling the residual samples of the at least one of the first and second chroma components based on a corresponding scaling parameter; and in accordance with a determination from the third syntax element that the ACT is applied to the coding unit, applying an inverse ACT to the luma and chroma residual samples of the coding unit after scaling.

According to a third aspect of the present application, an electronic apparatus includes one or more processing units, memory and a plurality of programs stored in the memory. The programs, when executed by the one or more processing units, cause the electronic apparatus to perform the methods of decoding video data as described above.

According to a fourth aspect of the present application, a non-transitory computer readable storage medium stores a plurality of programs for execution by an electronic apparatus having one or more processing units. The programs, when executed by the one or more processing units, cause the electronic apparatus to perform the methods of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 9 is a flowchart illustrating an example process by which a video decoder decodes the video data by conditionally performing the chroma residual scaling operation to the residuals of the coding unit in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

In some embodiments, the methods are provided to improve the coding efficiency of the VVC standard for 4:4:4 videos. In general, the main features of the technologies in this disclosure are summarized as follow.

In some embodiments, the methods are implemented to improve the existing ACT design that enables adaptive color space conversion in the residual domain. For example, special considerations are made to handle the interaction of the ACT with some existing coding tools in the VVC.

Figure 1:
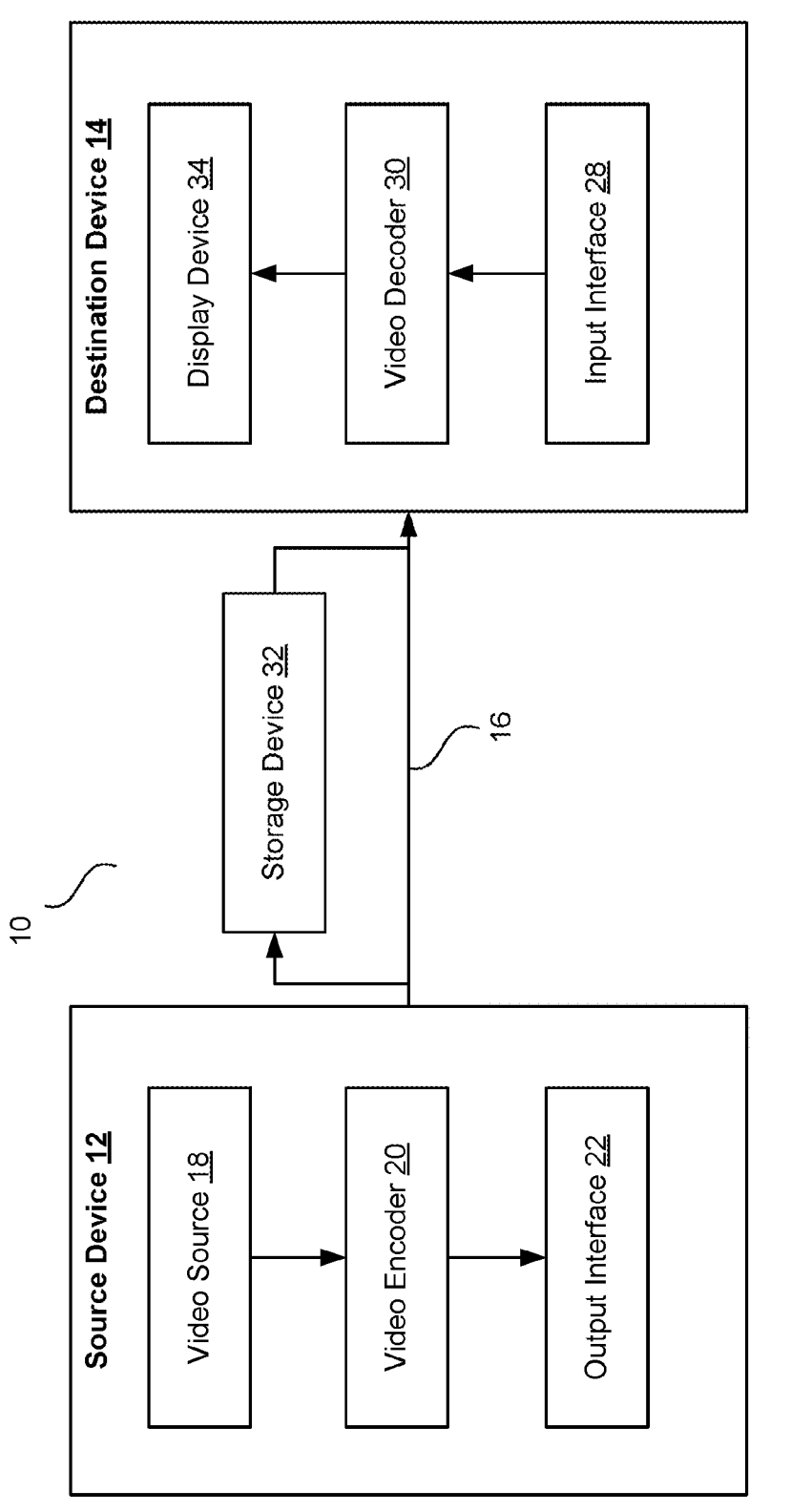
FIG. 1 is a block diagram illustrating an example video encoding and decoding system in accordance with some implementations of the present disclosure.

FIG. 1 is a block diagram illustrating an example system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some implementations, the encoded video data may be transmitted from output interface 22 to a storage device 32. Subsequently, the encoded video data in storage device 32 may be accessed by destination device 14 via input interface

28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Example file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), AVS, or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
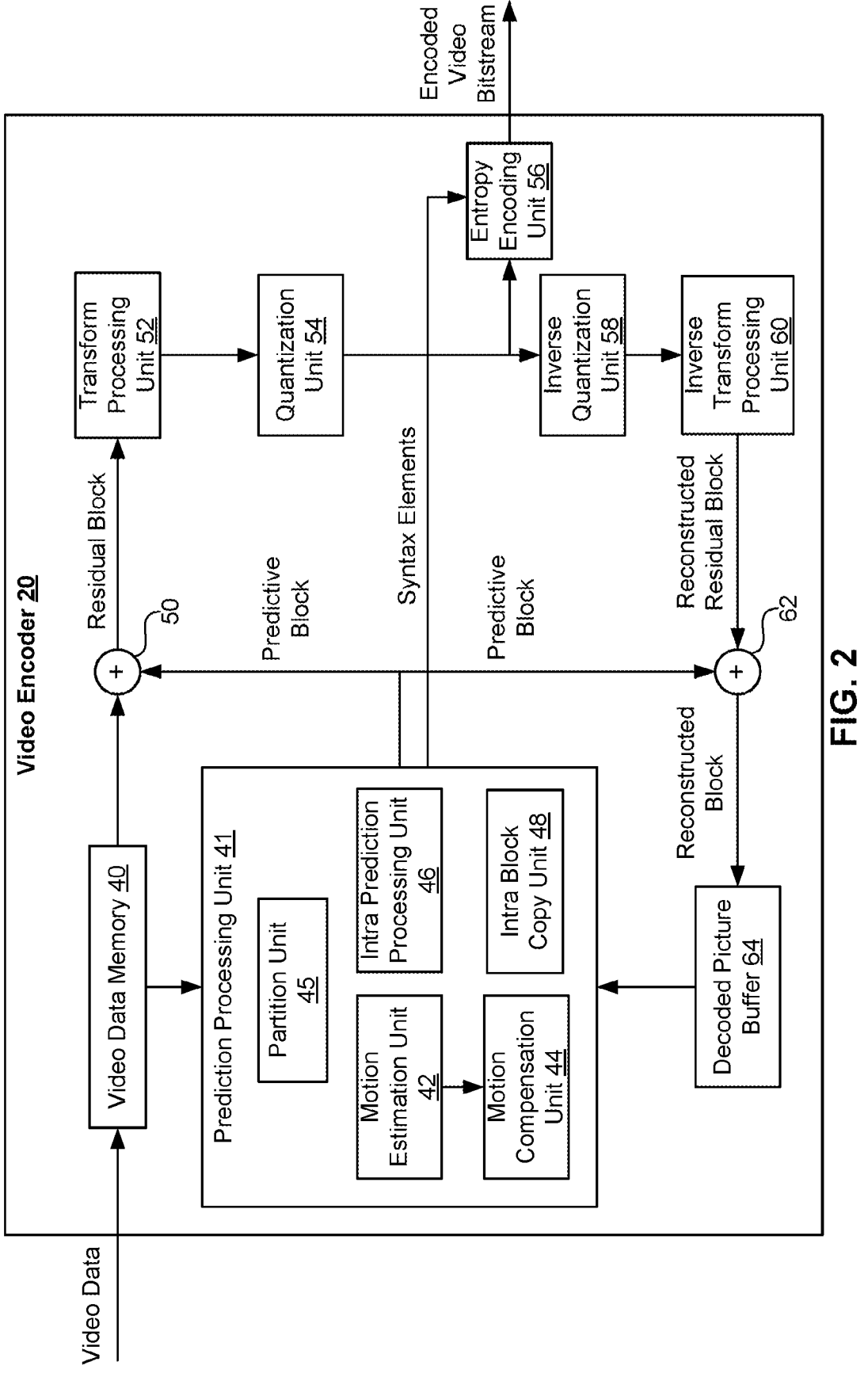
FIG. 2 is a block diagram illustrating an example video encoder in accordance with some implementations of the present disclosure.

FIG. 2 is a block diagram illustrating an example video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. An in-loop filter, such as a deblocking filter (not shown) may be positioned between summer 62 and DPB 64 to filter block boundaries to remove blocky artifacts from reconstructed video. Another in-loop filter (not shown) may also be used in addition to the deblocking filter to filter the output of summer 62. Further in-loop filtering, such as sample adaptive offset (SAO) and adaptive in-loop filter (ALF) may be applied on the reconstructed CU before it is put in the reference picture store and used as reference to code future video blocks. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame.

Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative or addition to the inter-prediction performed by motion estimation unit 42 and motion compensation unit 44, or the intra block copy prediction performed by intra BC unit 48, as described above. For example, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively or additionally, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
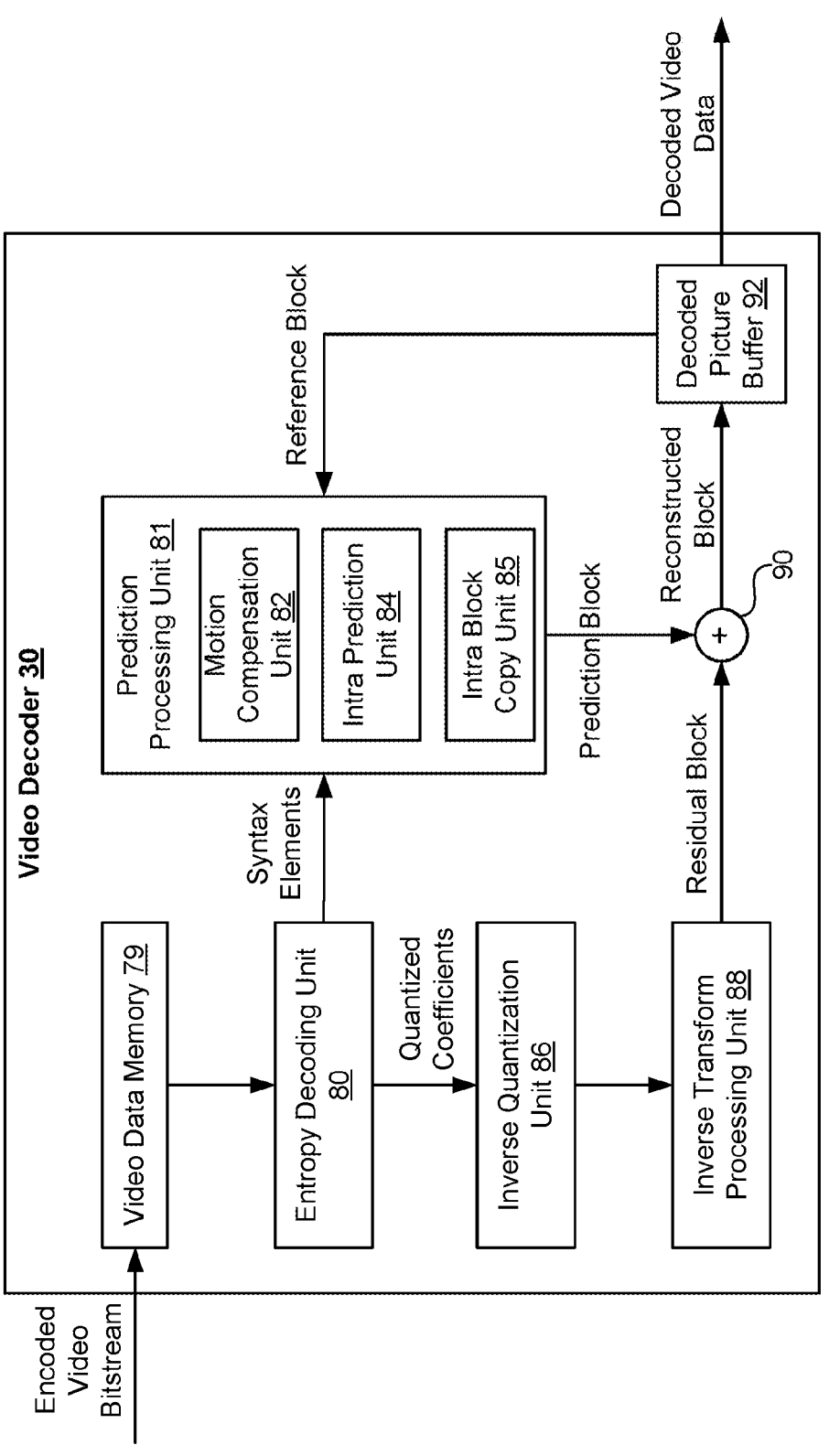
FIG. 3 is a block diagram illustrating an example video decoder in accordance with some implementations of the present disclosure.

FIG. 3 is a block diagram illustrating an example video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The in-loop filtering, such as deblocking filter, sample adaptive offset (SAO) and adaptive in-loop filter (ALF) may be applied on the reconstructed CU before it is put in the reference picture store. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
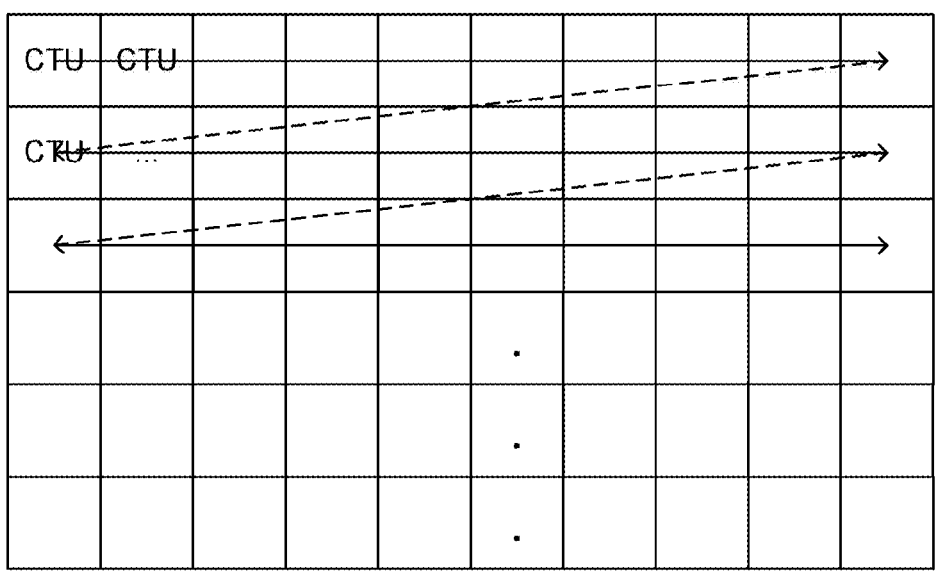
FIGS. 4A through 4E are block diagrams illustrating how a frame is recursively partitioned into multiple video blocks of different sizes and shapes in accordance with some implementations of the present disclosure.
Figure 4B:
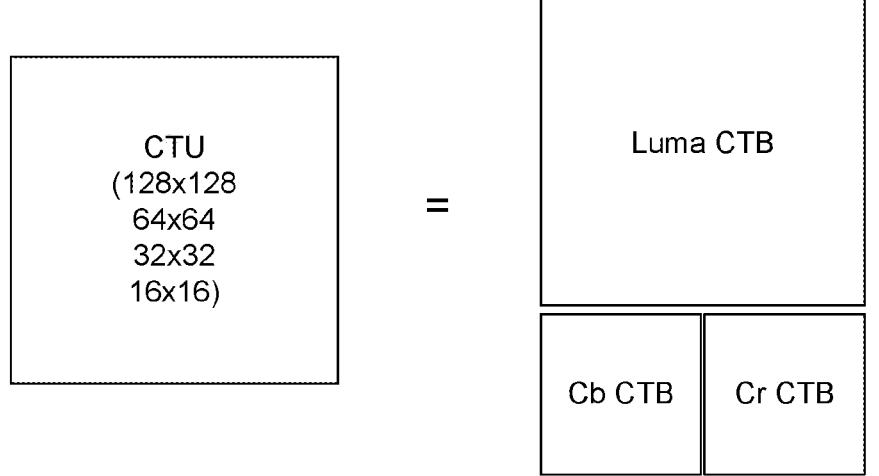

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
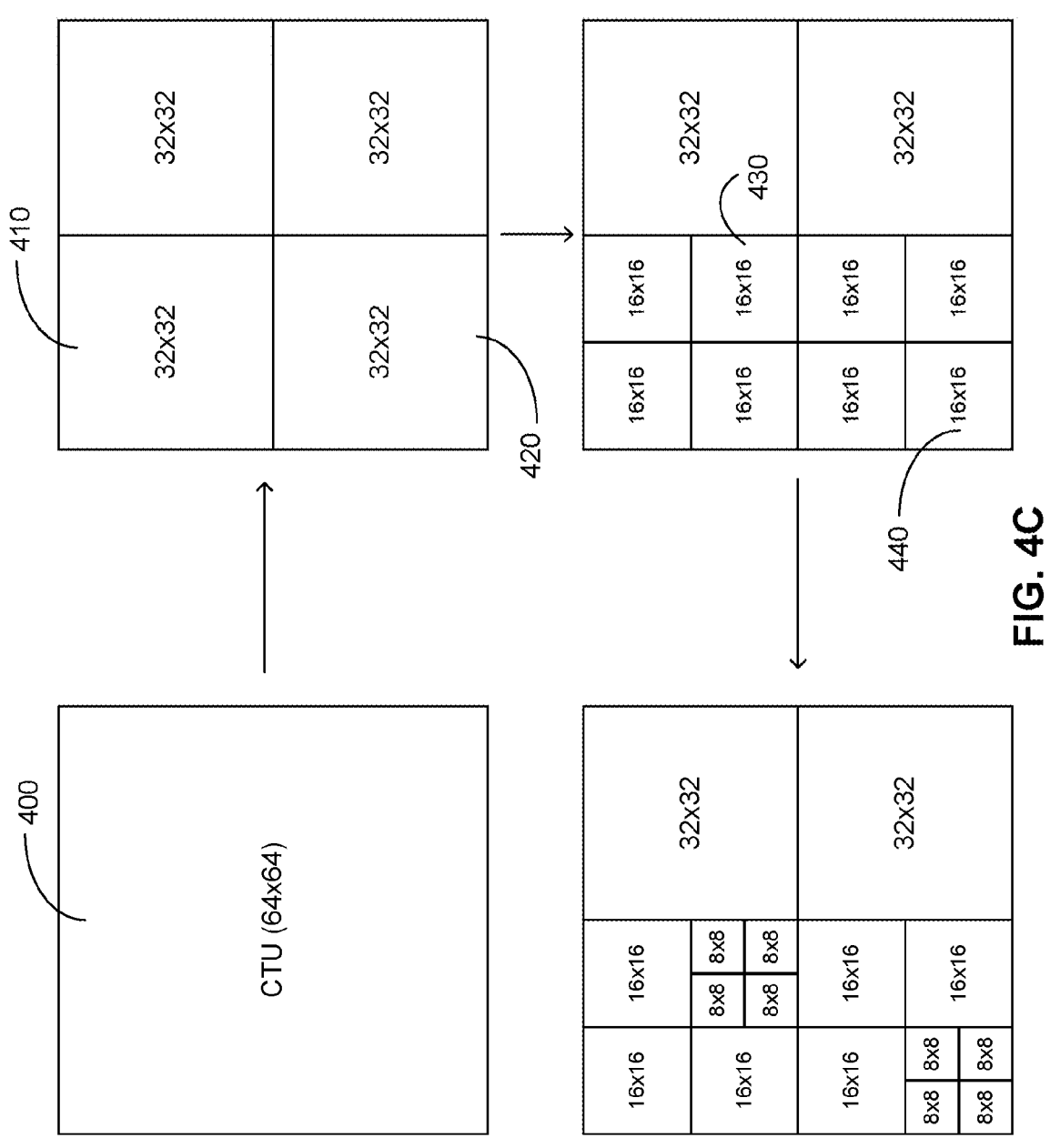
Figure 4D:
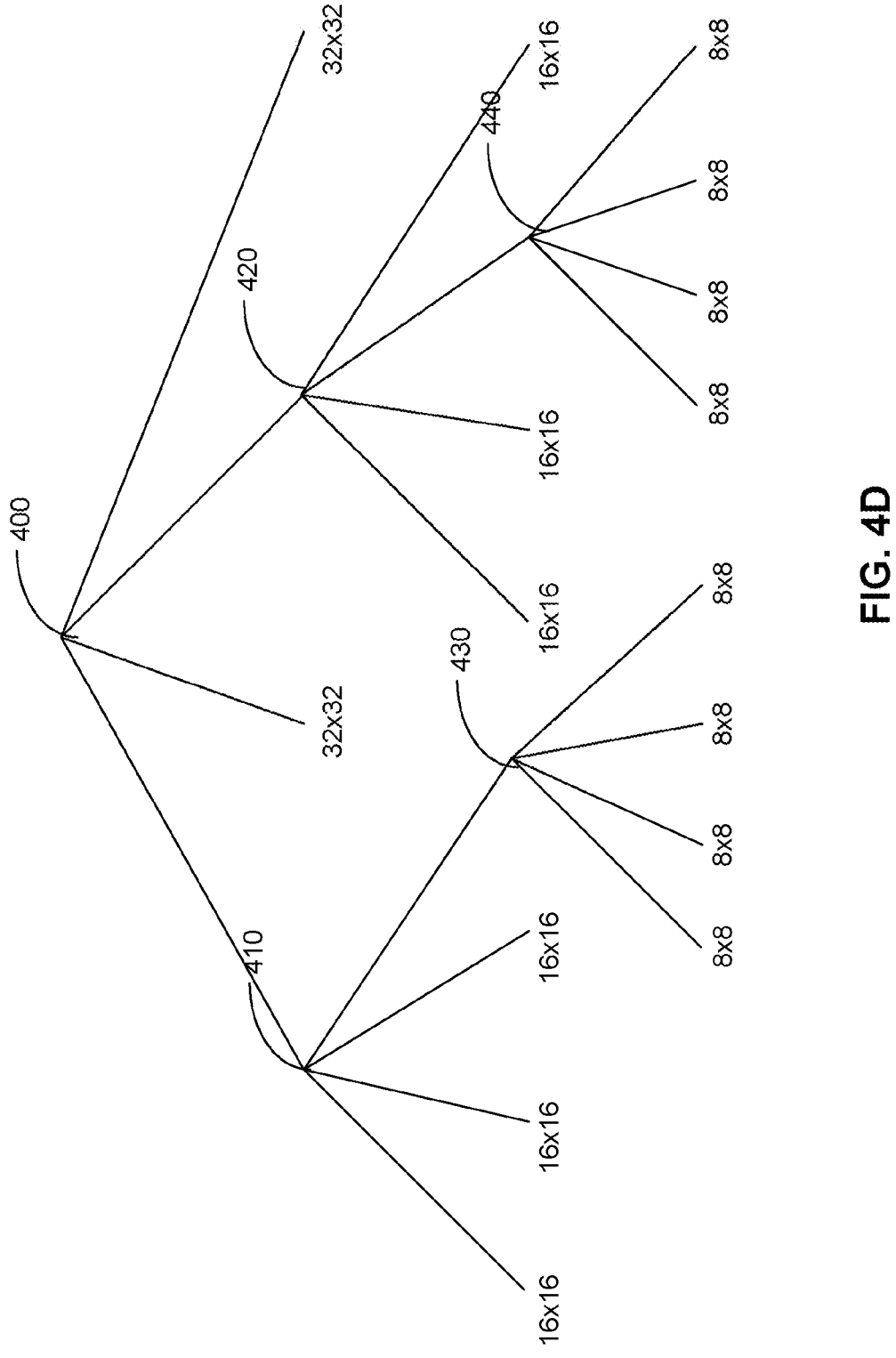
Figure 4E:
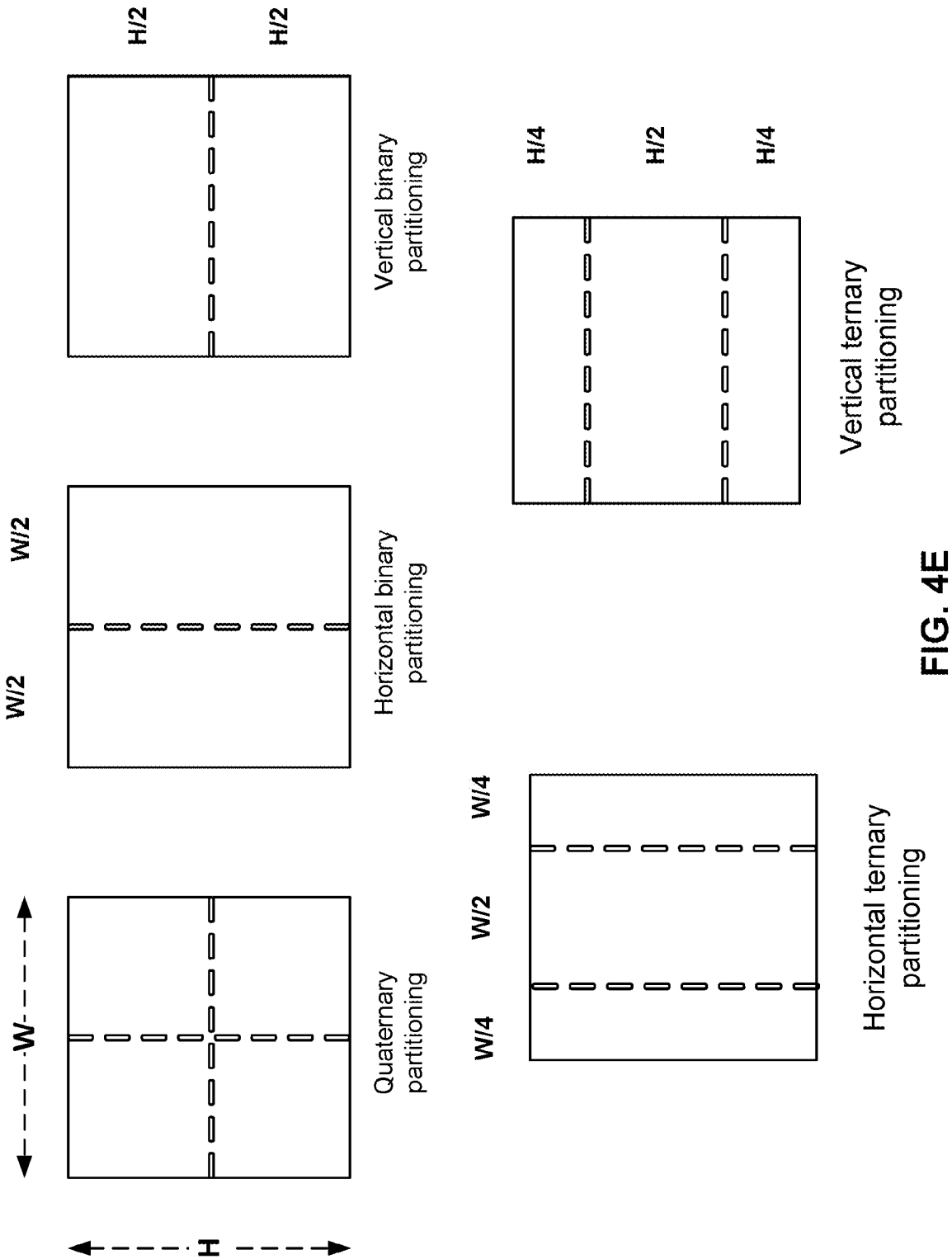

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5A:
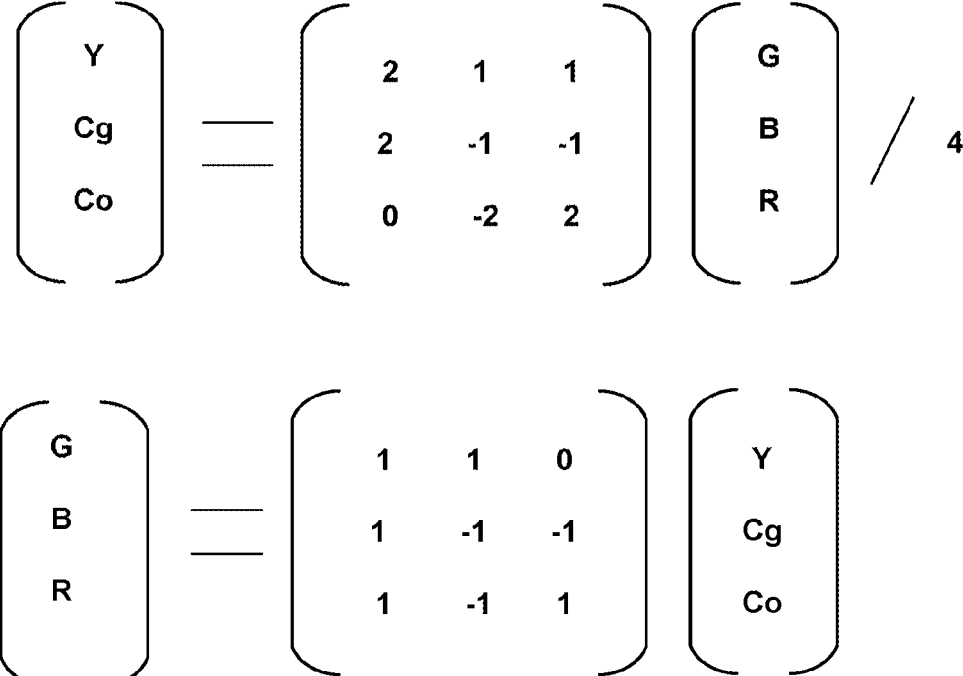
FIGS. 5A and 5B are block diagrams illustrating examples of applying the technique of adaptive color-space transform (ACT) to transform residuals between RGB color space and YCgCo color space in accordance with some implementations of the present disclosure.
Figure 5B:
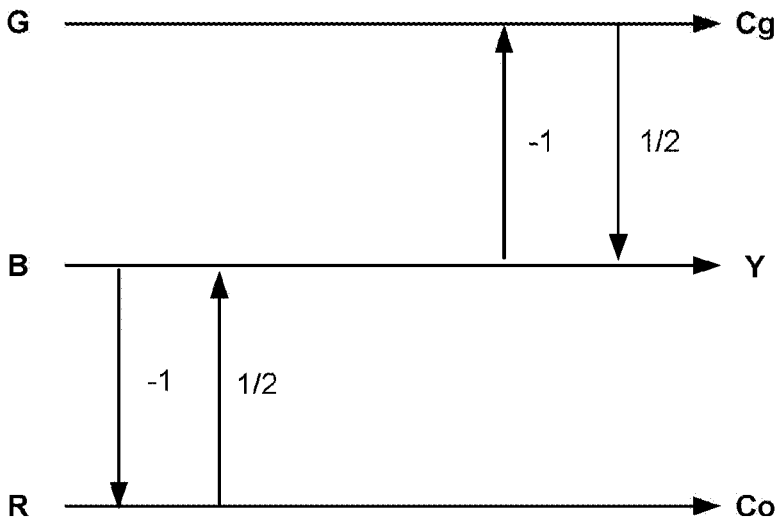
Figure 5B:
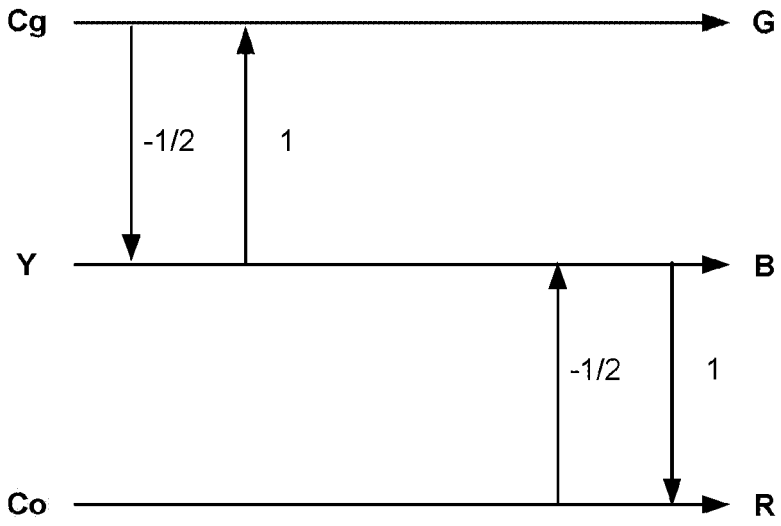

FIGS. 5A through 5B are block diagrams illustrating examples of applying the technique of adaptive color-space transform (ACT) to transform residuals between RGB color space and YCgCo color space in accordance with some implementations of the present disclosure.

In the HEVC screen content coding extension, ACT is applied to adaptively transform residuals from one color space (e.g., RGB) into another color space (e.g., YCgCo) such that the correlation (e.g., redundancy) between three color components (e.g., R, G, and B) are significantly reduced in the YCgCo color space. Further, in the existing ACT design, the adaptation of different color spaces is carried out at transform unit (TU) level by signaling one flag tu_act_enabled_flag for each TU. When the flag tu_act_enabled_flag is equal to one, it indicates that the residuals of the current TU is coded in the YCgCo space; otherwise (i.e., the flag is equal to 0), it indicates that the residuals of the current TU is coded in the original color space (i.e., without color space conversion). Additionally, depending on whether the current TU is coded in lossless mode or in lossy mode, different color space transform formulas are applied. Specifically, the forward and the inverse color space transform formulas between the RGB color space and the YCgCo color space for lossy modes are defined in FIG. 5A.

For lossless mode, the reversible version of RGB-YCgCo transform (also known as YCgCo-LS) is used. The reversible version of RGB-YCgCo transform is implemented based on lifting operations depicted in FIG. 5B and the related description.

As shown in FIG. 5A, the forward and inverse color transform matrices used in lossy mode are not normalized. Therefore, the magnitude of the YCgCo signal is smaller than that of the original signal after the color transform is applied. In order to compensate the decrease in magnitude caused by the forward color transform, an adjusted quantization parameter is applied to the residuals in the YCgCo domain. Specifically, when the color space transform is applied, the QP values $QP_Y$, $QP_{Cg}$ and $QP_{Co}$, which are used to quantize the YCgCo domain residuals, are set to be QP−5, QP−5 and QP−3 respectively, where QP is the quantization parameter used in the original color space.

Figure 6:
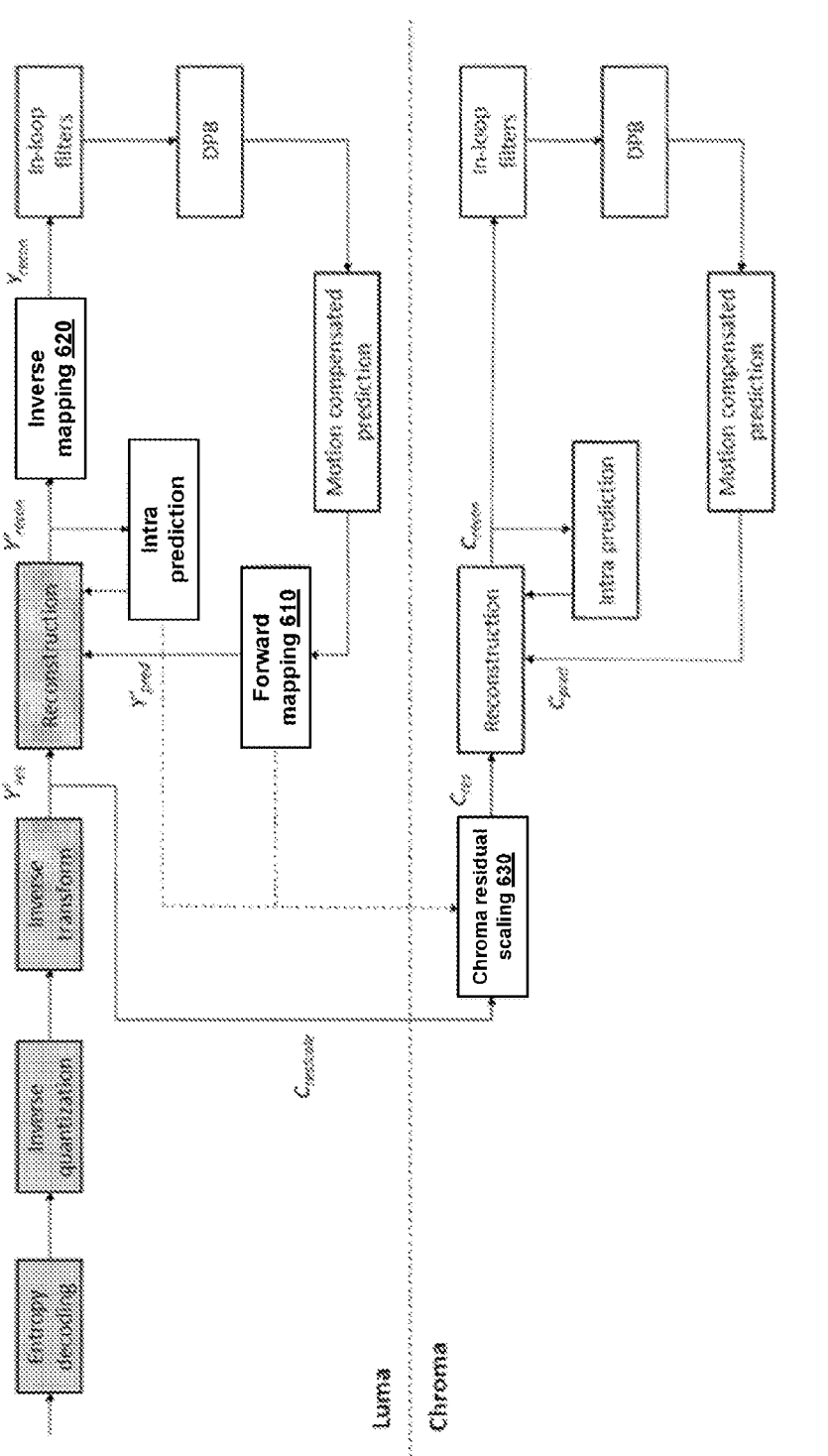
FIG. 6 is a block diagram of applying the technique of luma mapping with chroma scaling (LMCS) in an example video data decoding process in accordance with some implementations of the present disclosure.

FIG. 6 is a block diagram of applying the technique of luma mapping with chroma scaling (LMCS) in an example video data decoding process in accordance with some implementations of the present disclosure.

In the VVC, LMCS is used as a new coding tool applied before the in-loop filters (e.g., the de-blocking filter, the SAO and the ALF). In general, LMCS has two main modules: 1) in-loop mapping of the luma component based on adaptive piecewise linear models; 2) luma-dependent chroma residual scaling. FIG. 6 shows a modified decoding process with LMCS being applied. In FIG. 6, decoding modules that are conducted in the mapped domain include the entropy decoding module, the inverse quantization module, the inverse transform module, the luma intra prediction module, and the luma sample reconstruction module (i.e., the addition of the luma prediction samples and the luma residual samples). The decoding modules that are conducted in the original (i.e., non-mapped) domain include the motion compensated prediction module, the chroma intra prediction module, the chroma sample reconstruction module (i.e., the addition of the chroma prediction samples and the chroma residual samples), and all the in-loop filter modules such as the deblocking module, the SAO module, and the ALF module. The new operational modules introduced by LMCS include the forward mapping module 610 of luma samples, the inverse mapping module 620 of luma samples, and the chroma residual scaling module 630.

The in-loop mapping of LMCS can adjust the dynamic range of the input signal to improve the coding efficiency. The in-loop mapping of the luma samples in the existing LMCS design is built upon two mapping functions: one forward mapping function FwdMap and one corresponding inverse mapping function InvMap. The forward mapping function is signaled from encoder to decoder using one piecewise linear model with sixteen equal-size pieces. The inverse mapping function can be directly derived from the forward mapping function and therefore does not need to be signaled.

The parameters of luma mapping model are signaled at slice level. A presence flag is firstly signaled to indicate if luma mapping model is to be signaled for a current slice. If luma mapping model is present in the current slice, the corresponding piecewise linear model parameters are further signaled. Additionally, at slice level, another LMCS control flag is signaled to enable/disable LMCS for the slice.

Chroma residual scaling module 630 is designed to compensate for the interaction of quantization precision between the luma signal and its corresponding chroma signals when the in-loop mapping is applied to the luma signal. It is also signaled in the slice header whether chroma residual scaling is enabled or disabled for the current slice. If luma mapping is enabled, an additional flag is signaled to indicate if luma-dependent chroma residual scaling is applied or not. When luma mapping is not used, luma-dependent chroma residual scaling is always disabled and no additional flag is required. Additionally, the chroma residual scaling is always disabled for the CUs that contain less than or equal to four chroma samples.

Figure 7:
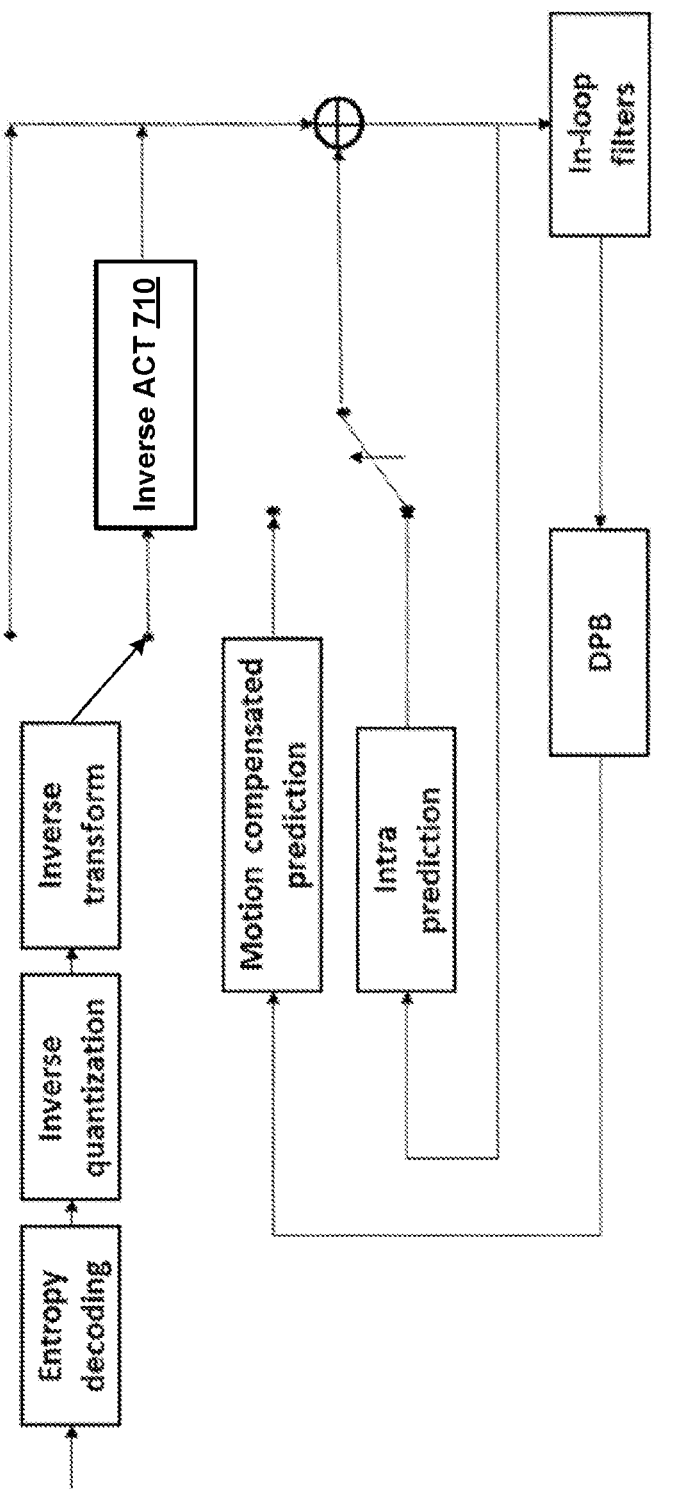
FIG. 7 is a block diagram illustrating an example video decoding process by which a video decoder implements the technique of inverse adaptive color-space transform (ACT) in accordance with some implementations of the present disclosure.

FIG. 7 is a block diagram illustrating an example video decoding process by which a video decoder implements the technique of inverse adaptive color-space transform (ACT) in accordance with some implementations of the present disclosure.

Similar to ACT design in the HEVC SCC, ACT in VVC converts the intra/inter prediction residuals of one CU in 4:4:4 chroma format from an original color space (e.g., RGB color space) into YCgCo color space. As a result, the redundancy between three color components can be reduced for better coding efficiency. FIG. 7 depicts the decoding flowchart in which how the inverse ACT is applied in the VVC framework through the addition of the inverse ACT module 710. When processing a CU encoded with ACT being enabled, the entropy decoding, the inverse quantization and the inverse DCT/DST-based transform first apply to the CU. After that, as depicted in FIG. 7, the inverse ACT is invoked to convert the decoded residuals from YCgCo color space to the original color space (e.g., RGB and YCbCr). Additionally, because ACT in lossy mode are not normalized, the QP adjustments of $(-5,-5,-3)$ are applied to Y, Cg and Co components to compensate the changed magnitude of transformed residuals.

In some embodiments, ACT method reuses the same ACT core transforms of the HEVC to do the color conversion between different color spaces. Specifically, two different versions of color transforms are applied depending on whether a current CU is coded in lossy or lossless manner. The forward and inverse color transforms for lossy case use the irreversible YCgCo transform matrix as depicted in FIG. 5A. For the lossless case, the reversible color transform YCgCo-LS as shown in FIG. 5B is applied. Moreover, different from the existing ACT design, the following changes are introduced to the ACT scheme to handle its interaction with the other coding tools in the VVC standard.

For example, because the residuals of one CU in the HEVC may be partitioned into multiple TUs, ACT control flag is separately signaled for each TU to indicate whether the color space conversion needs to be applied or not. However, as described above in connection with FIG. 4E, one quadtree nested with binary and ternary partition structure is applied in the VVC to replace the multiple partition type concept, thus removing the separate CU, PU and TU partitions in the HEVC. This means that in most cases one CU leaf node is also used as the unit of prediction and transform processing without further partition, unless the maximum supported transform size is smaller than the width or height of one component of the CU. Based on such partition structure, the ACT at CU level is enabled and disabled adaptively. Specifically, one flag cu_act_enabled_flag is signaled for each CU to select between the original color space and the YCgCo color space for coding the residuals of the CU. If the flag is equal to 1, it indicates that the residuals of all the TUs within the CU are coded in the YCgCo color space. Otherwise, if the flag cu_act_enabled_flag is equal to 0, all the residuals of the CU are coded in the original color space.

In some embodiments, there are different scenarios of disabling the ACT. When the ACT is enabled for one CU, it needs to access the residuals of all three components to do the color space conversion. However, the VVC design cannot guarantee that each CU always contain the information of three components. According to the embodiment of the disclosure, in those cases where a CU does not contain the information of all three components, the ACT should be forcibly disabled.

Firstly, in some embodiments, when separate-tree partition structure is applied, the luma and chroma samples inside one CTU are partitioned into CUs based on separate partition structures. As a result, the CUs in the luma partition tree only contain the coding information of luma component and the CUs in the chroma partition tree only contain the coding information of two chroma components. According to the current VVC, the switch between single-tree and separate-tree partition structures is carried out at slice-level. Therefore, according to the embodiment of the disclosure, when it is found that the separate-tree is applied to one slice, the ACT will be always disabled for all the CUs inside the slice (both the luma CUs and chroma CUs) without signaling the ACT flag which is inferred to be zero instead.

Secondly, in some embodiments, when the ISP mode (further described below) is enabled, the TU partition is only applied to the luma samples while the chroma samples are coded without further splitting into multiple TUs. Assuming N is number of ISP sub-partitions (i.e., TUs) for one intra CU, according to the current ISP design, only the last TU contains both luma and chroma components while the first N-1 ISP TUs are composed of only luma component. According to an embodiment of the disclosure, ACT is disabled under ISP mode. There are two ways to disable the ACT for the ISP mode. In the first method, the ACT enabling/disabling flag (i.e. cu_act_enabled_flag) is signaled before signaling the syntax of ISP mode. In such case, when the flag cu_act_enabled_flag is equal to one, the ISP mode will not be signaled in bitstream but always inferred to be zero (i.e. switched off). In the second method, the ISP mode signaling is used to bypass the signaling of the ACT flag. Specifically, in this method, the ISP mode is signaled prior to the flag cu_act_enabled_flag. When the ISP mode is selected, the flag cu_act_enabled_flag is not signaled and inferred to be zero. Otherwise (the ISP mode is not selected), the flag cu_act_enabled_flag will be still signaled to adaptively select the color space for the residual coding of the CU.

In some embodiments, in addition to forcibly disable the ACT for the CUS where luma and chroma partition structure are misaligned, the LMCS is disabled for the CUS where the ACT is applied. In one embodiment, both the luma mapping and chroma residual scaling are disabled when one CU select YCgCo color space to code its residuals (i.e., the ACT is one). In another embodiment, when the ACT is enabled for one CU, only chroma residual scaling is disabled while the luma mapping can still be applied to adjust the dynamic range of the output luma samples. In the last embodiment, both the luma mapping and chroma residual scaling are enabled for the CUs which applies the ACT for coding its residuals. There may be multiple ways to enable the chroma residual scaling for CUs which apply the ACT. In one method, the chroma residual scaling is applied before the inverse ACT at decoding. By this method, it means that when the ACT is applied the chroma residual scaling is applied to the chroma residuals in the YCgCo domain (i.e., Cg and Co residuals). In another method, the chroma residual scaling is applied after the inverse ACT. Specifically, by the second method, the chroma scaling is applied to the residuals in the original color spaces. Assuming input video is captured in RGB format, it means that the chroma residual scaling is applied to the residuals of B and R components.

In some embodiments, a syntax element, e.g., sps_act_en-abled_flag, is added to the sequence parameter set (SPS) to indicate if ACT is enabled or not at the sequence level. In addition, as the color-space conversion is applied to video content whose luma and chroma components have the same resolution (e.g., 4:4:4 chroma format 4:4:4), one bitstream conformance requirement needs to be added such that ACT can be enabled only for 4:4:4 chroma format. Table 1 illustrates the modified SPS syntax table with the above syntax added.

TABLE 1

| Modified SPS syntax table | |
| --- | --- |
| | Descriptor |
| seq_parameter_set_rbsp( ) { | |
| ... | |
| sps_act_enabled_flag | u(1) |
| ... | |
| } | |

Specifically, sps_act_enabled_flag equal to 1 indicates ACT is enabled and sps_act_enabled_flag equal to 0 indicates that ACT is disabled such that the flag cu_act_enabled_flag is not signaled for the CUs that refers to the SPS but inferred to be 0. When ChromaArrayType is not equal to 3, it is a requirement of the bitstream conformance that the value of sps_act_enabled_flag shall be equal to 0.

In another embodiment, instead of always signaling sps_act_enabed_flag, the signaling of the flag is conditioned on the chroma type of the input signal. Specifically, given that ACT can only be applied when luma and chroma components are in the same resolution, the flag sps_act_enabled_flag is only signaled when the input video is captured in the 4:4:4 chroma format. With such change, the modified SPS syntax table is:

TABLE 2

| Modified SPS syntax table with Signaling Condition | |
| --- | --- |
| | Descriptor |
| seq_parameter_set_rbsp( ) { | |
| ... | |
| if(chroma_format_idc == 3) | |
| sps_act_enabled_flag | u(1) |
| ... | |
| } | |

In some embodiments, the syntax design specification for decoding video data using ACT is illustrated in the following table.

TABLE 3

| Specification for Signaling ACT Mode | |
| --- | --- |
| | Descriptor |
| coding_unit( x0, y0, cbWidth, cbHeight, cqtDepth, treeType, modeType ) | |
| { | |
|   chType = treeType == DUAL_TREE_CHROMA? 1 : 0 | |
|   if( slice_type != I \| \| sps_ibc_enabled_flag \| \| | |
| sps_palette_enabled_flag) { | |
|     if( treeType != DUAL_TREE_CHROMA && | |
|     !( ( ( cbWidth == 4 && cbHeight == 4 ) \| \| modeType == | |
| MODE_TYPE_INTRA ) | |
|       && !sps_ibc_enabled_flag ) ) | |
|       cu_skip_flag[ x0 ][ y0 ] | ae(v) |
|     if( cu_skip_flag[ x0 ][ y0 ] == 0 && slice_type != I | |
|     && !( cbWidth == 4 && cbHeight == 4 ) && modeType == | |
| MODE_TYPE_ALL ) | |
|       pred_mode_flag | ae(v) |
|     if( ( ( slice_type == I && cu_skip_flag[ x0 ][ y0 ] ==0 ) \| \| | |
|       ( slice_type != I && ( CuPredMode[ chType ][ x0 ][ y0 ] != | |
| MODE_INTRA \| \| | |
|         ( cbWidth == 4 && cbHeight == 4 && | |
| cu_skip_flag[ x0 ][ y0 ] == 0 ) ) ) ) && | |
|         cbWidth <= 64 && cbHeight <= 64 && modeType != | |
| MODE_TYPE_INTER && | |
|           sps_ibc_enabled_flag && treeType != | |
| DUAL_TREE_CHROMA ) | |
|         pred_mode_ibc_flag | ae(v) |
|     if( ( ( ( slice_type == I \| \| ( cbWidth == 4 && cbHeight == 4 ) \| \| | |
| sps_ibc_enabled_flag ) && | |
|         CuPredMode[ x0 ][ y0 ] == MODE_INTRA ) \| \| | |
|         ( slice_type != I && !( cbWidth == 4 && cbHeight == 4 ) && | |
| !sps_ibc_enabled_flag | |
|         && CuPredMode[ x0 ][ y0 ] != MODE_INTRA ) ) && | |
| sps_palette_enabled_flag && | |
|         cbWidth <= 64 && cbHeight <= 64 && && | |
| cu_skip_flag[ x0 ][ y0 ] == 0 && | |
|         modeType != MODE_INTER ) | |
|       pred_mode_plt_flag | ae(v) |
|   } | |

TABLE 3-continued

| Specification for Signaling ACT Mode | |
|---|---|
| | Descriptor |
| if( CuPredMode[ chType ][ x0 ][ y0 ] == MODE_INTRA ) | |
|   cu_act_enabled_flag | |
| if( CuPredMode[ chType ][ x0 ][ y0 ] = = MODE_INTRA \| \| | |
|   CuPredMode[ chType ][ x0 ][ y0 ] = = MODE_PLT ) { | |
|   if( treeType = = SINGLE_TREE \| \| treeType = = | |
| DUAL_TREE_LUMA ) { | |
|     if( pred_mode_plt_flag ) { | |
|       if( treeType = = DUAL_TREE_LUMA ) | |
|         palette_coding( x0, y0, cbWidth, cbHeight, 0, 1 ) | |
|       else /* SINGLE_TREE */ | |
|         palette_coding( x0, y0, cbWidth, cbHeight, 0, 3 ) | |
|     } else { | |
|       if( sps_bdpcm_enabled_flag && | |
|         cbWidth <= MaxTsSize && cbHeight <= MaxTsSize ) | |
|         intra_bdpcm_flag | ae(v) |
|       if( intra_bdpcm_flag ) | |
|         intra_bdpcm_dir_flag | ae(v) |
|       else { | |
|         if( sps_mip_enabled_flag && | |
|          ( Abs( Log2( cbWidth ) − Log2( cbHeight ) ) <= 2 ) && | |
|           cbWidth <= MaxTbSizeY && cbHeight <= MaxTbSizeY ) | |
|          intra_mip_flag[ x0 ][ y0 ] | ae(v) |
|         if( intra_mip_flag[ x0 ][ y0 ] ) | |
|          intra_mip_mode[ x0 ][ y0 ] | ae(v) |
|         else { | |
|          if( sps_mrl_enabled_flag && ( ( y0 % CtbSizeY ) > 0 ) ) | |
|           intra_luma_ref_idx[ x0 ][ y0 ] | ae(v) |
|          if ( sps_isp_enabled_flag && | |
| intra_luma_ref_idx[ x0 ][ y0 ] = = 0 && | |
|           ( cbWidth <= MaxTbSizeY && cbHeight <= | |
| MaxTbSizeY ) && | |
|           ( cbWidth * cbHeight > MinTbSizeY * MinTbSizeY ) && | |
| !cu_act_enabled_flag) | |
|           intra_subpartitions_mode_flag[ x0 ][ y0 ] | ae(v) |
|          if( intra_subpartitions_mode_flag[ x0 ][ y0 ] = = 1 ) | |
|           intra_subpartitions_split_flag[ x0 ][ y0 ] | ae(v) |
|          if( intra_luma_ref_idx[ x0 ][ y0 ] = = 0 ) | |
|           intra_luma_mpm_flag[ x0 ][ y0 ] | ae(v) |
|          if( intra_luma_mpm_flag[ x0 ][ y0 ] ) { | |
|           if( intra_luma_ref_idx[ x0 ][ y0 ] = = 0 ) | |
|            intra_luma_not_planar_flag[ x0 ][ y0 ] | ae(v) |
|           if( intra_luma_not_planar_flag[ x0 ][ y0 ] ) | |
|            intra_luma_mpm_idx[ x0 ][ y0 ] | ae(v) |
|          } else | |
|           intra_luma_mpm_remainder[ x0 ][ y0 ] | ae(v) |
|         } | |
|         } | |
|       } | |
|     } | |
|   } | |
|   if( ( treeType = = SINGLE_TREE \| \| treeType = = | |
| DUAL_TREE_CHROMA ) && | |
|       ChromaArrayType != 0 ) { | |
|     if ( pred_mode_plt_flag && treeType = = | |
| DUAL_TREE_CHROMA ) | |
|       palette_coding( x0, y0, cbWidth / SubWidthC, | |
| cbHeight / SubHeightC, 1, 2 ) | |
|     else { | |
|         if( !cu_act_enabled_flag ) { | |
|       if( CclmEnabled ) | |
|         cclm_mode_flag | ae(v) |
|       if( cclm_mode_flag ) | |
|         cclm_mode_idx | ae(v) |
|       else | |
|         intra_chroma_pred_mode | ae(v) |
|         } | |
|     } | |
|   } | |
| } else if( treeType != DUAL_TREE_CHROMA ) { /* MODE_INTER | |
| or MODE_IBC */ | |
|   if( cu_skip_flag[ x0 ][ y0 ] = = 0 ) | |
|     general_merge_flag[ x0 ][ y0 ] | ae(v) |

TABLE 3-continued

| | Descriptor |
|---|---|
| Specification for Signaling ACT Mode | |

```
    if( general_merge_flag[ x0 ][ y0 ] ) {
        merge_data( x0, y0, cbWidth, cbHeight, chType )
    } else if ( CuPredMode[ chType ][ x0 ][ y0 ] = = MODE_IBC ) {
        mvd_coding( x0, y0, 0, 0 )
        if( MaxNumIbcMergeCand > 1 )
            mvp_l0_flag[ x0 ][ y0 ]                                          ae(v)
        if( sps_amvr_endabled_flag &&
            ( MvdL0[ x0 ][ y0 ][ 0 ] != 0 | | MvdL0[ x0 ][ y0 ][ 1 ] != 0 ) ) {
            amvr_precision_idx[ x0 ][ y0 ]                                   ae(v)
        }
    } else {
        if( slice_type = = B )
            inter_pred_idc[ x0 ][ y0 ]                                      ae(v)
        if( sps_affine_enabled_flag && cbWidth >= 16 &&
cbHeight >= 16 ) {
            inter_affine_flag[ x0 ][ y0 ]                                   ae(v)
            if( sps_affine_type_flag && inter_affine_flag [ x0 ][ y0 ] )
                cu_affine_type_flag[ x0 ][ y0 ]                             ae(v)
        }
        if( sps_smvd_enabled_flag && !mvd_l1_zero_flag &&
            inter_pred_idc[ x0 ][ y0 ] = = PRED_BI &&
            !inter_affine_flag[ x0 ][ y0 ] && RefIdxSymL0 > -1 &&
RefIdxSymL1 > -1 )
            sym_mvd_flag[ x0 ][ y0 ]                                        ae(v)
        if( inter_pred_idc[ x0 ][ y0 ] != PRED_L1 ) {
            if( NumRefIdxActive[ 0 ] > 1 && !sym_mvd_flag[ x0 ][ y0 ] )
                ref_idx_l0[ x0 ][ y0 ]                                      ae(v)
            mvd_coding( x0, y0, 0, 0 )
            if( MotionModelIdc[ x0 ][ y0 ] > 0 )
                mvd_coding( x0, y0, 0, 1 )
            if(MotionModelIdc[ x0 ][ y0 ] > 1 )
                mvd_coding( x0, y0, 0, 2 )
            mvp_l0_flag[ x0 ][ y0 ]                                         ae(v)
        } else {
            MvdL0[ x0 ][ y0 ][ 0 ] = 0
            MvdL0[ x0 ][ y0 ][ 1 ] = 0
        }
        if( inter_pred_idc[ x0 ][ y0 ] != PRED_L0 ) {
            if( NumRefIdxActive[ 1 ] > 1 && !sym_mvd_flag[ x0 ][ y0 ] )
                ref_idx_l1[ x0 ][ y0 ]                                      ae(v)
            if( mvd_l1_zero_flag && inter_pred_idc[ x0 ][ y0 ] = =
PRED_BI ) {
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
                MvdCpL1[ x0 ][ y0 ][ 2 ][ 0 ] = 0
                MvdCpL1[ x0 ][ y0 ][ 2 ][ 1 ] = 0
            } else {
                if( sym_mvd_flag[ x0 ][ y0 ] ) {
                    MvdL1[ x0 ][ y0 ][ 0 ] = -MvdL0[ x0 ][ y0 ][ 0 ]
                    MvdL1[ x0 ][ y0 ][ 1 ] = -MvdL0[ x0 ][ y0 ][ 1 ]
                } else
                    mvd_coding( x0, y0, 1, 0 )
                if( MotionModelIdc[ x0 ][ y0 ] > 0 )
                    mvd_coding( x0, y0, 1, 1 )
                if(MotionModelIdc[ x0 ][ y0 ] > 1 )
                    mvd_coding( x0, y0, 1, 2 )
                mvp_l1_flag[ x0 ][ y0 ]                                     ae(v)
            }
        } else {
            MvdL1[ x0 ][ y0 ][ 0 ] = 0
            MvdL1[ x0 ][ y0 ][ 1 ] = 0
        }
        if( ( sps_amvr_enabled_flag && inter_affine_flag[ x0 ][ y0 ] = =
0 &&
            ( MvdL0[ x0 ][ y0 ][ 0 ] != 0 | | MvdL0[ x0 ][ y0 ][ 1 ] != 0 | |
                MvdL1[ x0 ][ y0 ][ 0 ] != 0 | | MvdL1[ x0 ][ y0 ][ 1 ] != 0 ) )
| |
            ( sps_affine_amvr_enabled_flag &&
inter_affine_flag[ x0 ][ y0 ] = = 1 &&
                ( MvdCpL0[ x0 ][ y0 ][ 0 ] [ 0 ] != 0 | |
MvdCpL0[ x0 ][ y0 ][ 0 ] [ 1 ] != 0 | |
                    MvdCpL1[ x0 ][ y0 ][ 0 ] [ 0 ] != 0 | |
```

TABLE 3-continued

| Specification for Signaling ACT Mode | |
|---|---|
| | Descriptor |

```
MvdCpL1[ x0 ][ y0 ][ 0 ] [ 1 ] != 0 | |
           MvdCpL0[ x0 ][ y0 ][ 1 ] [ 0 ] != 0 | |
MvdCpL0[ x0 ][ y0 ][ 1 ] [ 1 ] != 0 | |
           MvdCpL1[ x0 ][ y0 ][ 1 ] [ 0 ] != 0 | |
MvdCpL1[ x0 ][ y0 ][ 1 ] [ 1 ] != 0 | |
           MvdCpL0[ x0 ][ y0 ][ 2 ] [ 0 ] != 0 | |
MvdCpL0[ x0 ][ y0 ][ 2 ] [ 1 ] != 0 | |
           MvdCpL1[ x0 ][ y0 ][ 2 ] [ 0 ] != 0 | |
MvdCpL1[ x0 ][ y0 ][ 2 ] [ 1 ] != 0 ) ) {
             amvr_flag[ x0 ][ y0 ]                              ae(v)
             if( amvr_flag[ x0 ][ y0 ] )
                amvr_precision_idx[ x0 ][ y0 ]                  ae(v)
          }
          if( sps_bcw_enabled_flag && inter_pred_idc[ x0 ][ y0 ] = =
PRED_BI &&
             luma_weight_l0_flag[ ref_idx_l0 [ x0 ][ y0 ] ] = = 0 &&
             luma_weight_l1_flag[ ref_idx_l1 [ x0 ][ y0 ] ] = = 0 &&
             chroma_weight_l0_flag[ ref_idx_l0 [ x0 ][ y0 ] ] = = 0 &&
             chroma_weight_l1_flag[ ref_idx_l1 [ x0 ][ y0 ] ] = = 0 &&
             cbWidth * cbHeight >= 256 )
             bcw_idx[ x0 ][ y0 ]                                ae(v)
      }
   }
   if( CuPredMode[ chType ][ x0 ][ y0 ] != MODE_INTRA
&& !pred_mode_plt_flag &&
      general_merge_flag[ x0 ][ y0 ] = = 0 )
      cu_cbf                                                    ae(v)
   if( cu_cbf ) {
      if( CuPredMode[ chType ][ x0 ][ y0 ] = = MODE_INTER &&
sps_sbt_enabled_flag
             && !ciip_flag[ x0 ][ y0 ] && !MergeTriangleFlag[ x0 ][ y0 ] ) {
          if( cbWidth <= MaxSbtSize && cbHeight <= MaxSbtSize ) {
             allowSbtVerH = cbWidth >= 8
             allowSbtVerQ = cbWidth >= 16
             allowSbtHorH = cbHeight >= 8
             allowSbtHorQ = cbHeight >= 16
             if( allowSbtVerH | | allowSbtHorH | | allowSbtVerQ | |
allowSbtHorQ )
                cu_sbt_flag                                     ae(v)
          }
          if( cu_sbt_flag ) {
             if( ( allowSbtVerH | | allowSbtHorH ) && ( allowSbtVerQ | |
allowSbtHorQ) )
                cu_sbt_quad_flag                                ae(v)
             if( ( cu_sbt_quad_flag && allowSbtVerQ && allowSbtHorQ )
| |
                ( !cu_sbt_quad_flag && allowSbtVerH && allowSbtHorH ) )
                cu_sbt_horizontal_flag                          ae(v)
             cu_sbt_pos_flag                                    ae(v)
          }
          if( sps_act_enabled_flag && CuPredMode[ chType ][ x0 ][ y0 ] !=
MODE_INTRA )
             cu_act_enabled_flag
      }
      LfnstDcOnly = 1
      LfnstZeroOutSigCoeffFlag = 1
      transform_tree( x0, y0, cbWidth, cbHeight, treeType )
      lfnstWidth = ( treeType = =
DUAL_TREE_CHROMA ) ? cbWidth / SubWidthC
                         : cbWidth
      lfnstHeight = ( treeType = =
DUAL_TREE_CHROMA ) ? cbHeight / SubHeightC
                         : cbHeight
      if( Min( lfnstWidth, lfnstHeight ) >= 4 &&
sps_lfnst_enabled_flag = = 1 &&
          CuPredMode[ chType ][ x0 ][ y0 ] = = MODE_INTRA &&
          IntraSubPartitionsSplitType = = ISP_NO_SPLIT &&
          ( !intra_mip_flag[ x0 ][ y0 ] | | Min( lfnstWidth, lfnstHeight ) >=
16 ) &&
          tu_mts_idx[ x0 ][ y0 ] = = 0 && Max( cbWidth, cbHeight ) <=
MaxTbSizeY) {
          if( LfnstDcOnly = = 0 && LfnstZeroOutSigCoeffFlag = = 1 )
             lfnst_idx[ x0 ][ y0 ]                              ae(v)
      }
   }
```

The flag cu_act_enabled_flag equal to 1 indicates that the residuals of the coding unit are coded in the YCgCo color space and the flag cu_act_enabled_flag equal to 0 indicates that the residuals of the coding unit are coded in the original color space (e.g., RGB or YCbCr). When the flag cu_act_enabled_flag is not present, it is inferred to be equal to 0.

In some embodiments, ACT signaling is conditioned on coded block flag (CBF). As indicated in FIG. 5A and FIG. 5B, the ACT can only affect the decoded residuals when the current CU contains at least one non-zero coefficient. If all the coefficients obtained from entropy decoding are zeros, the reconstructed residuals will be the same with or without the inverse ACT being applied. For inter mode and intra block copy (IBC) mode, the information on whether one CU contains non-zero coefficients or not is indicated by the CU root coded block flag (CBF), i.e., cu_cbf. When the flag is equal to one, it means that the residual syntax elements are present in the bitstream for the current CU. Otherwise (i.e., the flag is equal to 0), it means the residual syntax elements of the current CU will not be signaled and all the residuals of the CU are inferred to be zero. Therefore, for inter and IBC modes, it is proposed to only signal the flag cu_act_enabled_flag when the root CBF flag cu_cbf of the current CU is equal to one. Otherwise (i.e., the flag cu_cbf is equal to 0), the flag cu_act_enabled_flag will not be signaled and the ACT is always disabled for decoding the residuals of the current CU. On the other hand, different from the inter and IBC modes, the root CBF flag is not signaled for intra mode, i.e., no flag of cu_cbf can be used to condition the presence of the flag cu_act_enabled_flag for intra CUs.

In some embodiments, the ACT flag is used to conditionally enable/disable the CBF signaling of the luma component when the ACT is applied to one intra CU. Specifically, given one intra CU using the ACT, the decoder always assumes that at least one component contains non-zero coefficients. Therefore, when the ACT is enabled for one intra CU and there are no non-zero residuals existing in its transform blocks except its very last transform block, the CBF for its very last transform block is inferred to be one without signaling. For an intra CU that contains just one TU, it means if the CBFs for its two chroma components (as indicated by tu_cbf_cb and tu_cbf_cr) are zero, the CBF flag of the last component (i.e., tu_cbf_luma) is always inferred to be one without signaling. In one embodiment, such inference rule of luma CBF is only enabled for the intra CU which contains only one single TU for the residual coding.

Figure 8A:
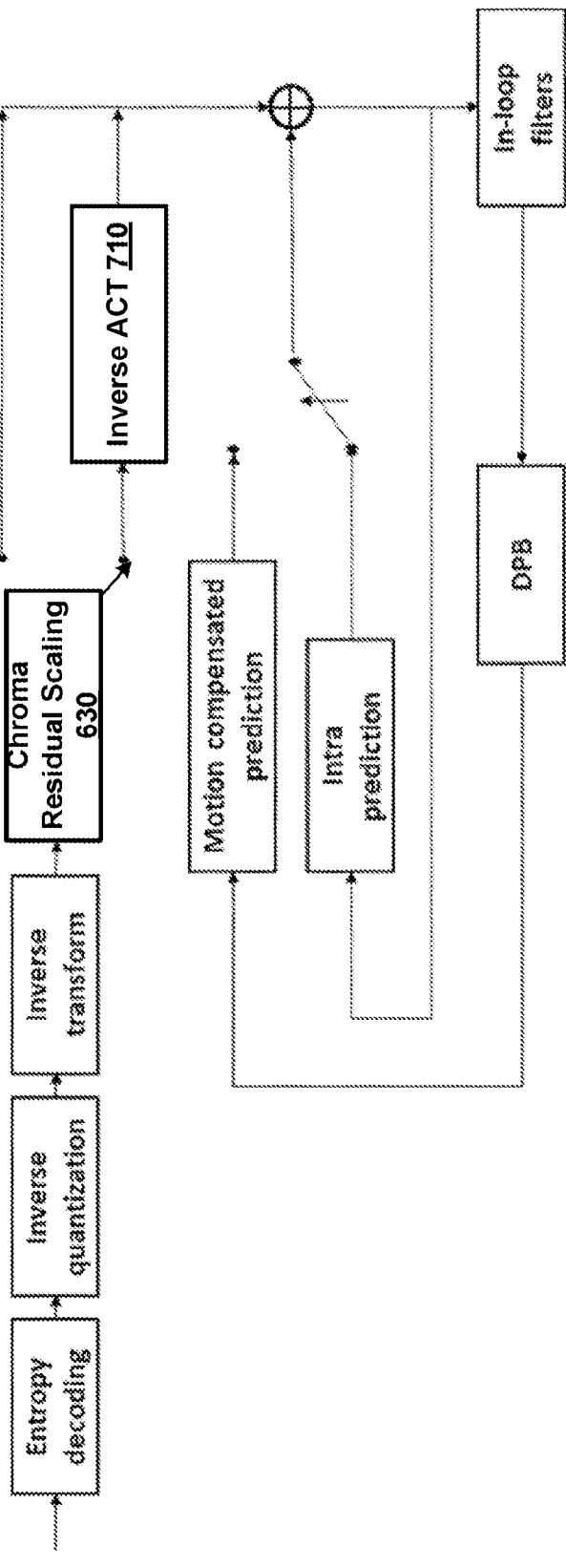
FIGS. 8A and 8B are block diagrams illustrating example video decoding processes by which a video decoder implements the technique of inverse adaptive color-space transform (ACT) and chroma residual scaling in accordance with some implementations of the present disclosure.
Figure 8B:
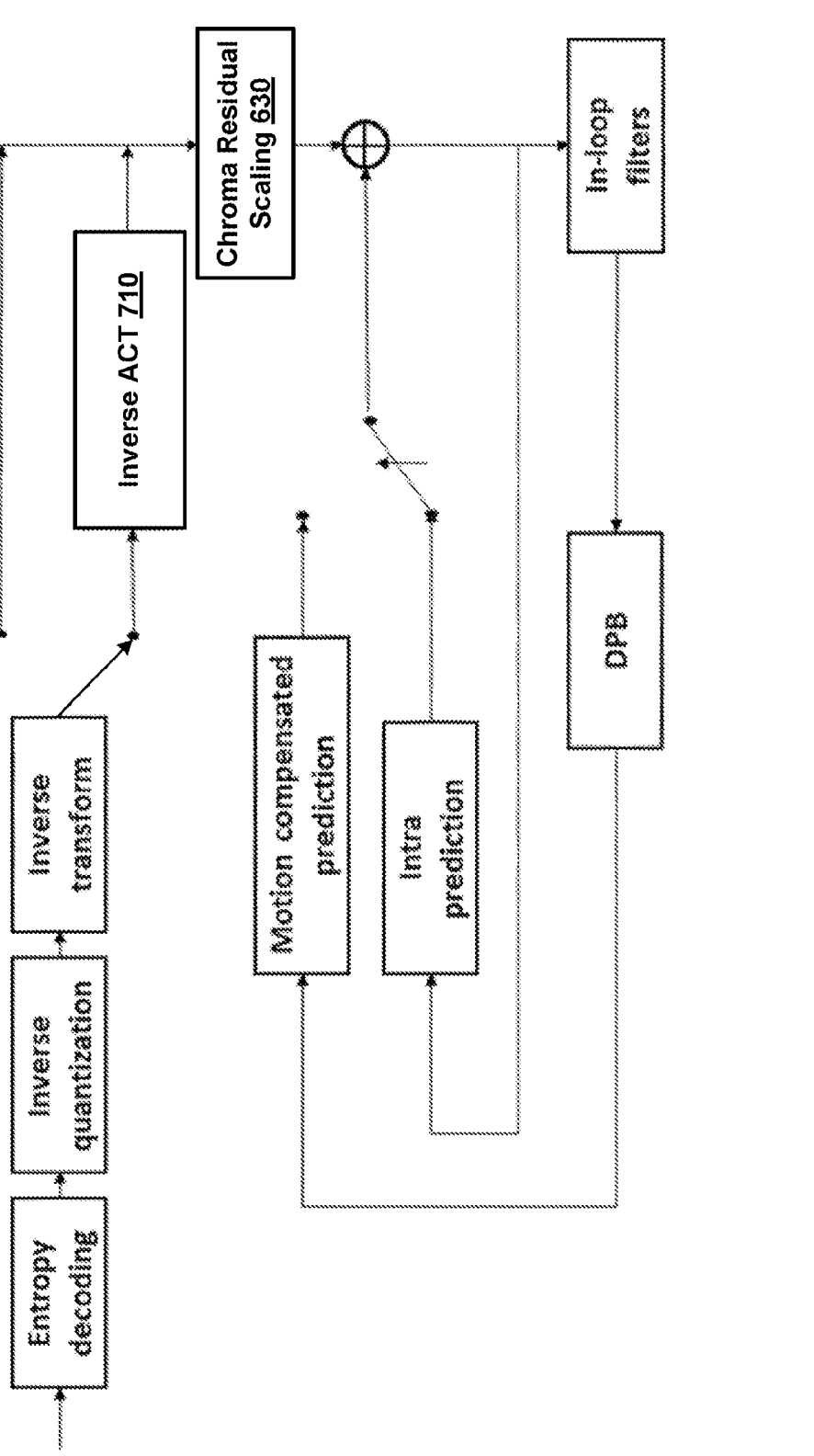

FIGS. 8A and 8B are block diagrams illustrating example video decoding processes by which a video decoder implements the technique of inverse adaptive color-space transform (ACT) and chroma residual scaling in accordance with some implementations of the present disclosure. In some embodiments, the video bitstream is coded using both ACT (e.g., inverse ACT 710 in FIG. 7) and chroma residual scaling (e.g., chroma residual scaling 630 in FIG. 6). In some other embodiments, the video bitstream is coded using chroma residual scaling but not both ACT, thereby not requiring the inverse ACT 710.

More specifically, FIG. 8A depicts an embodiment in which the video coder performs chroma residual scaling 630 before inverse ACT 710. As a result, the video coder performs luma mapping with chroma residual scaling 630 in the color-space transformed domain. For example, assuming that the input video is captured in RGB format and is transformed into YCgCo color space, the video coder performs chroma residual scaling 630 on the chroma residuals Cg and Co according to the luma residuals Y in the YCgCo color space.

In some embodiments, when the chroma residual scaling is applied in the YCgCo domain as shown in FIG. 8A, the corresponding chroma residual samples that are fed into the chroma residual scaling module are in the YCgCo domain. Correspondingly, the chroma CBF flags, i.e., tu_cb_cbf and tu_cr_cbf, of the current block can be used to indicate whether there are any non-zero chroma residual samples that are needed to be scaled. In such case, to avoid unnecessary chroma scaling at the decoder, additional checking condition on chroma CBF flags can be added to ensure that the chroma residual scaling is only invoked when at least one of two chroma CBF flags is not zero.

FIG. 8B depicts an embodiment in which the video coder performs chroma residual scaling 630 after the inverse ACT 710. As a result, the video coder performs luma mapping with chroma residual scaling 630 in the original color-space domain. For example, assuming the input video is captured in RGB format, the video coder applies chroma residual scaling on the B and R components.

In some embodiments, when the chroma residual scaling is applied in the RGB domain as shown in FIG. 8B, the corresponding residual samples that are feed into the chroma residual scaling module are in the RGB domain. In this case, the chroma CBF flags cannot indicate whether the corresponding B and R residual samples are all zeros or not. Therefore, in this method, the two chroma CBF flags cannot be used to decide whether the chroma residual scaling should be bypassed or not, when the ACT is applied to one CU. When the ACT is not applied to one CU, the two chroma CBF flags in the YCgCo space can still be used to decide whether the chroma residual scaling can be bypassed or not.

In some embodiments, the following shows the changes to the current VVC specification when the implemented signaling condition on checking CU-level ACT flag is applied to the chroma residual scaling at the decoder:

8.7.5.3 Picture Reconstruction with Luma Dependent Chroma Residual Scaling Process for Chroma Samples If one or more of the following conditions are true, recSamples[xCurr+i][yCurr+j] is set equal to Clip1 (predSamples[i][j]+resSamples[i][j]):

ph_chroma_residual_scale_flag is equal to 0.

sh_lmcs_used_flag is equal to 0.

nCurrSw*nCurrSh is less than or equal to 4.

tu_cb_coded_flag[xCurr][yCurr] is equal to 0 and tu_cr_coded_flag [xCurr][yCurr] is equal to 0 and cu_act_enabled_flag [xCurr*SubWidthC] [yCurr*SubHeightC] is equal to 0.

Otherwise, the following applies:

The current luma location (xCurrY, yCurrY) is derived as follows:

$$(xCurrY, yCurrY) = (xCurr * SubWidthC, yCurr * SubHeightC) \quad (1234)$$

The luma location (xCuCb, yCuCb) is specified as the top-left luma sample location of the coding unit that contains the luma sample at (xCurrY/size Y*size Y, yCurrY/size Y*size Y).

The variables availL and availT are derived as follows:

The derivation process for neighbouring block availability as specified in clause 6.4.4 is invoked with the location (xCurr, yCurr) set equal to (xCuCb, yCuCb), the neighbouring luma location (xNbY, yNbY) set equal to (xCuCb−1, yCuCb), check- PredModeY set equal to FALSE, and cIdx set equal to 0 as inputs, and the output is assigned to availL.

The derivation process for neighbouring block availability as specified in clause 6.4.4 is invoked with the location (xCurr, yCurr) set equal to (xCuCb, yCuCb), the neighbouring luma location (xNbY, yNbY) set equal to (xCuCb, yCuCb−1), check-PredModeY set equal to FALSE, and cIdx set equal to 0 as inputs, and the output is assigned to availT.

The variable currPic specifies the array of reconstructed luma samples in the current picture.

For the derivation of the variable varScale, the following ordered steps apply:

1. The variable invAvgLuma is derived as follows:
   The array recLuma[i] with i=0 . . . (2*sizeY−1) and the variable cnt are derived as follows:
   The variable cnt is set equal to 0.
   When availL is equal to TRUE, the array recLuma [i] with i=0 . . . size Y−1 is set equal to currPic [xCuCb−1][Min (yCuCb+i, pps_pic_height_in_luma_samples−1)] with i=0 . . . sizeY−1, and ent is set equal to size Y.
   When availT is equal to TRUE, the array recLuma [cnt+i] with i=0 . . . sizeY−1 is set equal to currPic [Min (xCuCb+i, pps_pic_width_in_luma_samples−1)][yCuCb−1] with i=0 . . . sizeY−1, and ent is set equal to (cnt+size Y).
   The variable invAvgLuma is derived as follows:
   If cnt is greater than 0, the following applies:

$$invAvgLuma = \left(\sum_{k=0}^{cnt-1} recLuma[k] + (cnt >> 1)\right) >> \text{Log2}(cnt) \quad (1235)$$

Otherwise (cnt is equal to 0), the following applies:

$$invAvgLuma = 1 << (Bitdepth - 1) \quad (1236)$$

2. The variable idxYInv is derived by invoking the identification of piece-wise function index process for a luma sample as specified in clause 8.8.2.3 with the variable lumaSample set equal to invAvgLuma as the input and idxYInv as the output.

3. The variable varScale is derived as follows:

$$varScale = ChromaScaleCoeff[idxYInv] \quad (1237)$$

FIG. 9 is a flowchart 900 illustrating an example process by which a video decoder (e.g., video decoder 30) decodes video data by conditionally performing the chroma residual scaling operation to the residuals of the coding unit in accordance with some implementations of the present disclosure.

The video decoder 30 receives, from the bitstream, a plurality of syntax elements associated with a coding unit, wherein the syntax elements include a first coded block flag (CBF) for residual samples of a first chroma component of the coding unit, a second CBF for residual samples of a second chroma component of the coding unit, and a third syntax element indicating whether adaptive color transform (ACT) is applied to the coding unit or not (910).

The video decoder 30 then determines whether to perform the chroma residual scaling to the residual samples of the first and second chroma components according to the first CBF, the second CBF, and the third syntax element (920).

In accordance with a determination to perform the chroma residual scaling to the residual samples of at least one of the first and second chroma components, video decoder 30 additionally scales the residual samples of the at least one of the first and second chroma components based on a corresponding scaling (930).

The video decoder 30 further reconstructs the samples of the coding unit using the luma and chroma residual samples after scaling (940).

In some embodiments, determining whether to perform the chroma residual scaling to the residual samples of the first and second chroma components according to the first CBF, the second CBF, and the third syntax element (920) includes: in accordance with a determination from the third syntax element that the ACT is applied to the coding unit: applying an inverse ACT to the luma and chroma residual samples of the coding unit; and determining to perform the chroma residual scaling to the residual samples of the first and second chroma components regardless of the first CBF and the second CBF after the inverse ACT.

In some embodiments, applying an inverse transform to the residual samples of the coding unit is before applying the inverse ACT.

In some embodiments, applying an inverse quantization to the residual samples of the coding unit is before applying the inverse transform.

In some embodiments, determining whether to perform the chroma residual scaling to the residual samples of the first and second chroma components according to the first CBF, the second CBF, and the third syntax element (920) includes: in accordance with a determination from the third syntax element that the ACT is not applied to the coding unit: determining to perform the chroma residual scaling to the residual samples of a chroma component of the coding unit when the CBF associated with the chroma component is not zero; or determining to bypass the chroma residual scaling to the residual samples of a chroma component of the coding unit when the CBF associated with the chroma component is zero.

In some embodiments, the first CBF is 0 when the non-zero chroma residual samples are not present in the residual samples of the first chroma component. In some embodiments, the second CBF is 0 when non-zero chroma residual samples are not present in the residual samples of the second chroma component.

In some embodiments, the corresponding scaling parameter is derived from reconstructed luma samples at a collocated position.

In some embodiments, the input to the inverse ACT is in YCbCo space.

In some embodiments, the output to the inverse ACT is in RGB space.

In some embodiments, a method of decoding a video block coded with chroma residual scaling, includes: receiving, from bitstream, a plurality of syntax elements associated with the coding unit, wherein the syntax elements include a first coded block flag (CBF) for residual samples of a first chroma component of the coding unit, a second CBF for residual samples of a second chroma component of the coding unit, and a third syntax element indicating whether adaptive color transform (ACT) is applied to the coding unit or not; determining whether to perform the chroma residual scaling to the residual samples of the first and second chroma components according to the first CBF, and the second CBF; in accordance with a determination to perform the chroma residual scaling to the residual samples of at least one of the first and second chroma components, scaling the residual samples of the at least one of the first and second chroma components based on a corresponding scaling parameter; and in accordance with a determination from the third syntax element that the ACT is applied to the coding unit, applying an inverse ACT to the luma and chroma residual samples of the coding unit after scaling. In some embodiments, applying an inverse transform to the residual samples of the coding unit is before performing the chroma residual scaling. In some embodiments, applying an inverse quantization to residual samples of the coding unit is before applying the inverse transform.

In some embodiments, determining whether to perform the chroma residual scaling to the residual samples of the first and second chroma components according to the first CBF, and the second CBF includes: determining to perform the chroma residual scaling to the residual samples of a chroma component of the coding unit when the CBF associated with the chroma component is not zero; determining to bypass the chroma residual scaling to the residual samples of a chroma component of the coding unit when the CBF associated with the chroma component is zero.

Further embodiments also include various subsets of the above embodiments combined or otherwise re-arranged in various other embodiments.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of video encoding, comprising:
   determining whether to perform chroma residual scaling to residual samples of at least one of first or second chroma components of a coding unit according to at least one of conditions, wherein the conditions comprise: whether quantized transform coefficients of the first chroma component contain a non-zero chroma quantized transform coefficient or not, whether quantized transform coefficients of the second chroma component contain a non-zero chroma quantized transform coefficients or not, and whether adaptive color transform (ACT) is applied to the coding unit or not, wherein the coding unit is associated with a partitioning method comprising at least one of quaternary partitioning, horizontal ternary partitioning, vertical ternary partitioning, horizontal binary partitioning or vertical binary partitioning;
   in response to a determination to perform the chroma residual scaling to the residual samples of the at least one of the first or second chroma components,
   scaling the residual samples of the at least one of the first or second chroma components based on a corresponding scaling parameter; and
   reconstructing chroma samples of the coding unit using chroma residual samples after scaling; and
   encoding at least one of a first coded block flag (CBF) of the first chroma component of the coding unit, a second CBF of the second chroma component of the coding unit, or a third syntax element indicating whether ACT is applied to the coding unit or not, into a video bitstream.

2. The method according to claim 1, further comprising:
   wherein in response to a determination that the ACT is applied to the coding unit:
   an inverse ACT is applied to luma and chroma residual samples of the coding unit; and
   wherein determining whether to perform chroma residual scaling to residual samples of the at least one of the first or second chroma components of the coding unit comprises:

in response to a determination that the ACT is applied to the coding unit, determining to perform the chroma residual scaling to residual samples of the at least one of the first or second chroma components after the inverse ACT has been applied regardless of whether quantized transform coefficients of the first chroma component contain a non-zero chroma quantized transform coefficients or not, and whether quantized transform coefficients of the second chroma component contain a non-zero chroma quantized transform coefficients or not.

3. The method according to claim 1, wherein determining whether to perform chroma residual scaling to residual samples of the at least one of the first or second chroma components of the coding unit comprises:

in response to a determination that the ACT is not applied to the coding unit:

determining to perform the chroma residual scaling to residual samples of one chroma component of the at least one of the first or second chroma components of the coding unit when the quantized transform coefficients of said one chroma component of the first CBF or the second CBF contain a non-zero chroma quantized transform coefficients; and determining not to perform the chroma residual scaling to the residual samples of said one chroma component of the coding unit when the quantized transform coefficients of said one chroma component do not contain any non-zero chroma quantized transform coefficient.

4. The method according to claim 2, further comprising: applying an inverse transform to transform coefficients of the coding unit before applying the inverse ACT.

5. The method according to claim 4, further comprising: applying an inverse quantization to quantized transform coefficients of the coding unit before applying the inverse transform.

6. The method according to claim 1, wherein:

the first CBF is zero when non-zero chroma quantized transform coefficients are not present in quantized transform coefficients of the first chroma component; and the second CBF is zero when non-zero chroma quantized transform coefficients are not present in quantized transform coefficients of the second chroma component.

7. The method according to claim 1, wherein the corresponding scaling parameter is derived from reconstructed luma samples.

8. The method according to claim 2, wherein an input to the inverse ACT is in YCgCo space.

9. The method according to claim 2, wherein an output of the inverse ACT is in RGB space.

10. The method according to claim 1, wherein the first CBF, the second CBF or the third syntax element is determined to be zero when not present in the video bitstream.

11. An electronic apparatus comprising:

one or more processing units;

memory coupled to the one or more processing units; and a plurality of programs stored in the memory that, when executed by the one or more processing units, cause the electronic apparatus to perform acts comprising:

determining whether to perform chroma residual scaling to residual samples of at least one of first or second chroma components of a coding unit according to at least one of conditions, wherein the conditions comprise: whether quantized transform coefficients of the first chroma component contain a non-zero chroma quantized transform coefficient or not, whether quantized transform coefficients of the second chroma component contain a non-zero chroma quantized transform coefficients or not, and whether adaptive color transform (ACT) is applied to the coding unit or not, wherein the coding unit is associated with a partitioning method comprising at least one of quaternary partitioning, horizontal ternary partitioning, vertical ternary partitioning, horizontal binary partitioning or vertical binary partitioning;

in response to a determination to perform the chroma residual scaling to the residual samples of the at least one of the first or second chroma components, scaling the residual samples of the at least one of the first or second chroma components based on a corresponding scaling parameter; and reconstructing chroma samples of the coding unit using chroma residual samples after scaling; and encoding at least one of a first coded block flag (CBF) of the first chroma component of the coding unit, a second CBF of the second chroma component of the coding unit, or a third syntax element indicating whether ACT is applied to the coding unit or not, into a video bitstream.

12. The apparatus according to claim 11, wherein the acts further comprising:

wherein in response to a determination that the ACT is applied to the coding unit:

an inverse ACT is applied to luma and chroma residual samples of the coding unit; and wherein determining whether to perform chroma residual scaling to residual samples of the at least one of the first or second chroma components of the coding unit comprises:

in response to a determination that the ACT is applied to the coding unit, determining to perform the chroma residual scaling to residual samples of the at least one of the first or second chroma components after the inverse ACT has been applied regardless of whether quantized transform coefficients of the first chroma component contain a non-zero chroma quantized transform coefficients or not, and whether quantized transform coefficients of the second chroma component contain a non-zero chroma quantized transform coefficients or not.

13. The apparatus according to claim 11, wherein determining whether to perform chroma residual scaling to residual samples of the at least one of the first or second chroma components of the coding unit comprises:

in response to a determination that the ACT is not applied to the coding unit:

determining to perform the chroma residual scaling to residual samples of one chroma component of the at least one of the first or second chroma components of the coding unit when the quantized transform coefficients of said one chroma component of the first CBF or the second CBF contain a non-zero chroma quantized transform coefficients; and determining not to perform the chroma residual scaling to the residual samples of said one chroma component of the coding unit when the quantized transform coefficients of said one chroma component do not contain any non-zero chroma quantized transform coefficient.

14. The apparatus according to claim 12, wherein the acts further comprising: applying an inverse transform to transform coefficients of the coding unit before applying the inverse ACT.

15. The apparatus according to claim 14, further comprising: applying an inverse quantization to quantized transform coefficients of the coding unit before applying the inverse transform.

16. The apparatus according to claim 11, wherein:

the first CBF is zero when non-zero chroma quantized transform coefficients are not present in quantized transform coefficients of the first chroma component; and the second CBF is zero when non-zero chroma quantized transform coefficients are not present in quantized transform coefficients of the second chroma component.

17. The apparatus according to claim 11, wherein the corresponding scaling parameter is derived from reconstructed luma samples.

18. The apparatus according to claim 12, wherein an input to the inverse ACT is in YCgCo space.

19. The apparatus according to claim 12, wherein an output of the inverse ACT is in RGB space.

20. A method for transmitting a bitstream, comprising:

generating the bitstream by performing a method of video encoding comprising acts of:

determining whether to perform chroma residual scaling to residual samples of at least one of first or second chroma components of a coding unit according to at least one of conditions, wherein the conditions comprise: whether quantized transform coefficients of the first chroma component contain a non-zero chroma quantized transform coefficient or not, whether quantized transform coefficients of the second chroma component contain a non-zero chroma quantized transform coefficients or not, or whether adaptive color transform (ACT) is applied to the coding unit or not, wherein the coding unit is associated with a partitioning method comprising at least one of quaternary partitioning, horizontal ternary partitioning, vertical ternary partitioning, horizontal binary partitioning or vertical binary partitioning;

in response to a determination to perform the chroma residual scaling to the residual samples of the at least one of the first or second chroma components, scaling the residual samples of the at least one of the first or second chroma components based on a corresponding scaling parameter; and reconstructing chroma samples of the coding unit using chroma residual samples after scaling; and encoding at least one of a first coded block flag (CBF) of the first chroma component of the coding unit, a second CBF of the second chroma component of the coding unit, or a third syntax element indicating whether ACT is applied to the coding unit or not, into a video bitstream; and transmitting the bitstream to an image decoding apparatus.

* * * * *